(12) United States Patent
Lee et al.

(10) Patent No.: US 11,082,094 B2
(45) Date of Patent: Aug. 3, 2021

(54) ELECTRONIC DEVICE INCLUDING PLURALITY OF ANTENNAS AND METHOD OF OPERATING SAME

(71) Applicant: Samsung Electronics Co., Ltd., Suwon-si (KR)

(72) Inventors: Hyang-Bok Lee, Seoul (KR); Man-Seob Kim, Suwon-si (KR); Tae-Lee Lee, Suwon-si (KR); Yong-Jun Park, Suwon-si (KR); Sung-Cheol Yoo, Seoul (KR); Hoon-Sang Yoo, Suwon-si (KR); Jung-Min Park, Suwon-si (KR); Byoung-Ryoul Song, Suwon-si (KR); Joon Heo, Suwon-si (KR); Jung-Hoon Park, Incheon (KR); Dong-Il Son, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 16/169,715

(22) Filed: Oct. 24, 2018

(65) Prior Publication Data

US 2019/0123786 A1 Apr. 25, 2019

(30) Foreign Application Priority Data

Oct. 25, 2017 (KR) .................. 10-2017-0139461

(51) Int. Cl.
*H04B 7/0404* (2017.01)
*H04B 7/06* (2006.01)
(Continued)

(52) U.S. Cl.
CPC ............. *H04B 7/0404* (2013.01); *H01Q 3/24* (2013.01); *H04B 1/0064* (2013.01);
(Continued)

(58) Field of Classification Search
CPC .. H04B 7/0404; H04B 1/0064; H04B 1/0067; H04B 1/44; H04B 7/0602; H04B 7/0608; H04B 7/0814; H01Q 3/24
See application file for complete search history.

(56) References Cited

U.S. PATENT DOCUMENTS 8,320,847 B2 * 11/2012 Weber .................. H04B 7/04
455/101
9,357,442 B2 * 5/2016 Lim .................... H04B 1/0064
(Continued)

FOREIGN PATENT DOCUMENTS

CN 102480315 A 5/2012
CN 107070483 A 8/2017
(Continued)

OTHER PUBLICATIONS

Extended European Search Report dated Feb. 25, 2019 regarding Application No. 18202478.6, 10 pages.
(Continued)

*Primary Examiner* — Nguyen T Vo

(57) ABSTRACT

An electronic device according to various exemplary embodiments may include a housing; a first antenna module configured to be disposed in a first end portion in the housing and to include a first antenna and a first amplifier circuitry to output a signal corresponding to the first antenna, a second antenna module configured to be disposed in a second end portion in the housing and to include a second antenna and a second amplifier circuitry to output a signal corresponding to the second antenna, and a transceiver configured to include a first port connected to the first antenna through the first amplifier circuitry and a second port connected to the second antenna through the second amplifier circuitry.

20 Claims, 21 Drawing Sheets

(51) Int. Cl.
*H01Q 3/24* (2006.01)
*H04B 1/44* (2006.01)
*H04B 7/08* (2006.01)
*H04B 1/00* (2006.01)

(52) U.S. Cl.
CPC ............ *H04B 1/0067* (2013.01); *H04B 1/44* (2013.01); *H04B 7/0602* (2013.01); *H04B 7/0608* (2013.01); *H04B 7/0814* (2013.01)

(56) References Cited

U.S. PATENT DOCUMENTS

| | | | |
|---|---|---|---|
| 10,014,901 B1* | 7/2018 | Wang | H03F 3/195 |
| 10,211,862 B2* | 2/2019 | Poulin | H03F 3/72 |
| 2006/0063494 A1 | 3/2006 | Zhang et al. | |
| 2011/0085588 A1* | 4/2011 | Zhuang | H04B 7/0691 |
| | | | 375/219 |
| 2012/0129469 A1 | 5/2012 | Lorenz et al. | |
| 2013/0308476 A1 | 11/2013 | He et al. | |
| 2014/0038675 A1 | 2/2014 | Khlat et al. | |
| 2014/0192927 A1* | 7/2014 | Kim | H04B 7/0689 |
| | | | 375/299 |
| 2014/0227982 A1* | 8/2014 | Granger-Jones | H04B 1/0064 |
| | | | 455/77 |
| 2014/0269853 A1 | 9/2014 | Gudem et al. | |
| 2014/0328223 A1* | 11/2014 | Tange | H04B 15/04 |
| | | | 370/278 |
| 2016/0080012 A1 | 3/2016 | Sun et al. | |
| 2016/0197629 A1* | 7/2016 | Jeong | H04B 1/0064 |
| | | | 455/313 |
| 2016/0337025 A1 | 11/2016 | Xu et al. | |
| 2017/0163217 A1* | 6/2017 | Bonebright | H03F 3/245 |
| 2017/0163323 A1 | 6/2017 | Xiong et al. | |
| 2017/0207534 A1 | 7/2017 | Zhang | |
| 2017/0288717 A1 | 10/2017 | Lee et al. | |
| 2018/0138927 A1* | 5/2018 | Nagumo | H04B 1/0057 |
| 2019/0006999 A1* | 1/2019 | Kim | H01L 23/66 |

FOREIGN PATENT DOCUMENTS

| | | |
|---|---|---|
| CN | 107293320 A | 10/2017 |
| EP | 3425808 A1 | 1/2019 |
| EP | 3442077 A1 | 2/2019 |
| GB | 2460112 A | 11/2009 |
| KR | 10-2015-0121247 A | 10/2015 |
| WO | 2017155285 A1 | 9/2017 |
| WO | 2017/175964 A1 | 10/2017 |

OTHER PUBLICATIONS

Communication pursuant to Article 94(3) EPC dated Jun. 2, 2020 in connection with European Patent Application No. 18 202 478.6, 8 pages.

Notification of the First Office Action dated May 8, 2021 in connection with Chinese Application No. 201811241386.X, 12 pages.

Notification of the Reasons for Rejection dated Jun. 10, 2021 in connection with Korean Application No. 10-2015-0139461, 11 pages.

* cited by examiner

| FREQUENCY BAND | FIRST FREQUENCY BAND | | | SECOND FREQUENCY BAND | | |
|---|---|---|---|---|---|---|
| Conduction | 23.5 | 23.7 | 23.6 | 23.5 | 23.8 | 23.7 |
| ANTENNA 2 | 14.9 | 14.3 | 15 | 16.5 | 16 | 14.9 |
| ANTENNA 1 | 13.5 | 13.6 | 12.6 | 14.2 | 14.7 | 14.1 |
| ANTENNA 2 - ANTENNA 1 | 1.4 | 0.7 | 2.4 | 2.3 | 1.3 | 0.8 |

FIG.9

ELECTRONIC DEVICE INCLUDING PLURALITY OF ANTENNAS AND METHOD OF OPERATING SAME

CROSS-REFERENCE TO RELATED APPLICATION

This application claims the priority under 35 U.S.C. § 119(a) to Korean Patent Application Serial No. 10-2017-0139461, which was filed in the Korean Intellectual Property Office on Oct. 25, 2017, the entire content of which is hereby incorporated by reference.

BACKGROUND

1. Field

Various exemplary embodiments relate to an electronic device including a plurality of antennas, and a method of operating the same.

2. Description of Related Art

Electronic devices may communicate with a network via an antenna. Electronic devices may include a plurality of antennas for smooth communication with a network.

Electronic devices may quickly transmit or receive data to or from a network using a plurality of antennas.

Electronic devices may have antennas for transmitting or receiving a signal corresponding to data in a lower end portion and an upper end portion of the electronic devices. However, some of a plurality of antennas included in electronic devices may deteriorate in performance depending on how a user uses the device. For example, when a user holds an electronic device, the performance of an antenna disposed in a lower end portion of the electronic device may deteriorate.

When the performance of an antenna of an electronic device deteriorates, the electronic device may transmit lossy data to a network. Further, when the performance of the antenna of the electronic device deteriorates, the electronic device cannot transmit data to a network.

SUMMARY

According to various exemplary embodiments, there may be provided an electronic device and a method of operating the same that are capable of outputting a signal, which is output through a first antenna among a plurality of antennas, through a second antenna among the plurality of antennas when the performance of the first antenna among the plurality of antennas deteriorates.

According to various exemplary embodiments, there may be provided an electronic device and a method of operating the same that are capable of performing uplink carrier aggregation.

An electronic device, according to various exemplary embodiments, may include: a housing, a first antenna circuitry that is disposed in a first end portion in the housing and includes a first antenna and a first amplifier circuitry in order to output a signal corresponding to the first antenna, a second antenna module that is disposed in a second end portion in the housing and includes a second antenna and a second amplifier circuitry in order to output a signal corresponding to the second antenna, and a transceiver configured to include a first port connected to the first antenna through the first amplifier circuitry and a second port connected to the second antenna through the second amplifier circuitry.

A method for operating an electronic device, according to various exemplary embodiments, may include outputting a first signal, corresponding to first data, to a first antenna disposed in a first end portion of the electronic device via the first port of a transceiver included in the electronic device through one of a first amplifier, a second amplifier, or a third amplifier disposed in the first end portion of the electronic device, outputting the first signal through the second port of the transceiver on the basis of the frequency band of the first signal when antenna switching is required; and advancing the first signal, after being output from the second port, to a second antenna disposed in a second end portion of the electronic device through one of a fourth amplifier or a fifth amplifier disposed in the second end portion on the basis of the frequency band of the first signal.

According to various exemplary embodiments, when the performance of an antenna disposed in one area of an electronic device deteriorates, the electronic device may switch a path for a signal to an antenna disposed in another area of an electronic device, thereby minimizing the loss of a transmitted signal.

According to various exemplary embodiments, an electronic device may perform uplink carder aggregation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the present disclosure will be more apparent from the following detailed description taken in conjunction with the accompanying drawings, in which:

FIG. 9 is a table for explaining a method of comparing the performance of antennas according to various exemplary embodiments of the present disclosure;

DETAILED DESCRIPTION

FIGS. 1 through 17D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
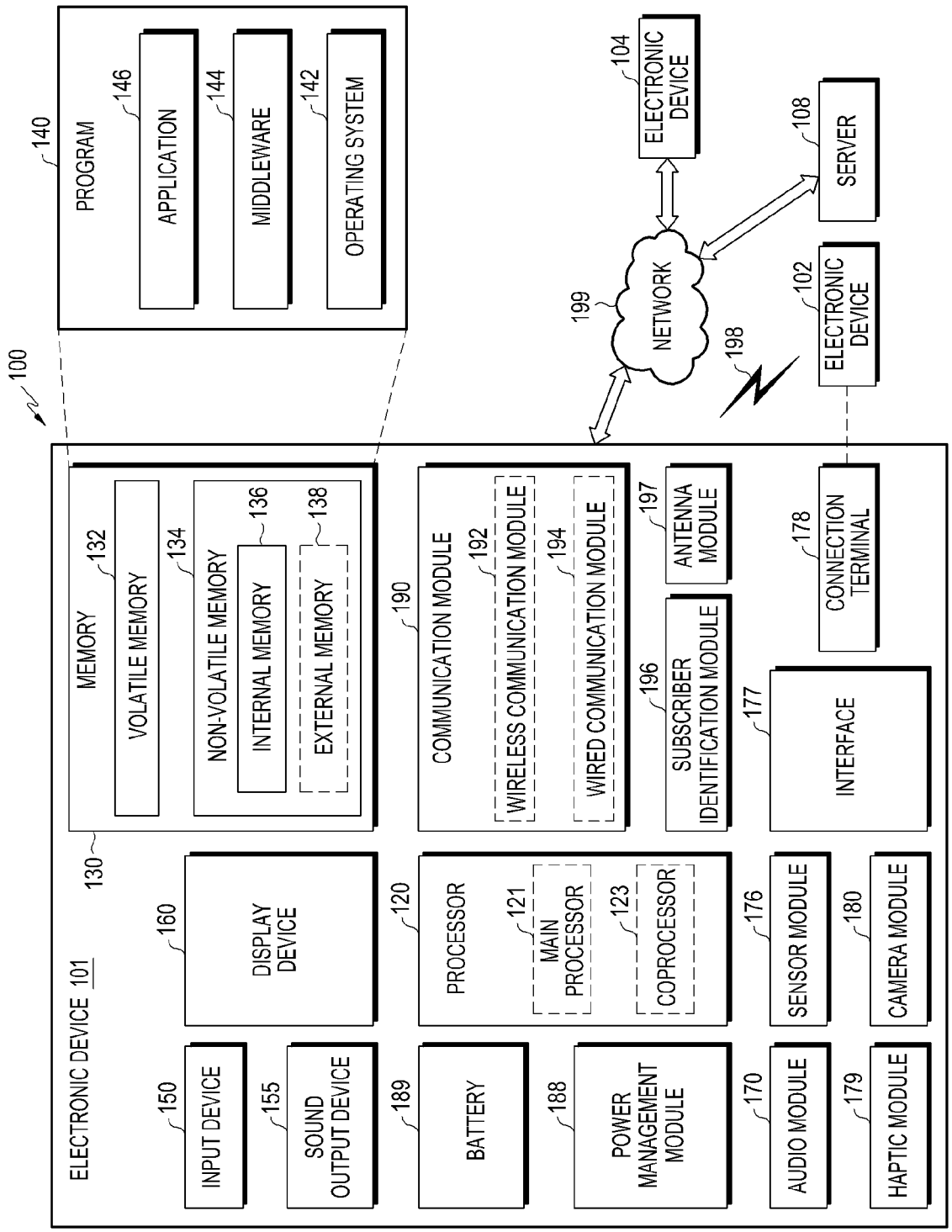
FIG. 1 is a block diagram illustrating an electronic device in a network environment according to various exemplary embodiments of the present disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the terms "module" and "unit" may include a unit implemented in hardware, software, or firmware, and may interchangeably be used with other terms, for example, "logic," "logic block," "part," or "circuitry". A module and a unit may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
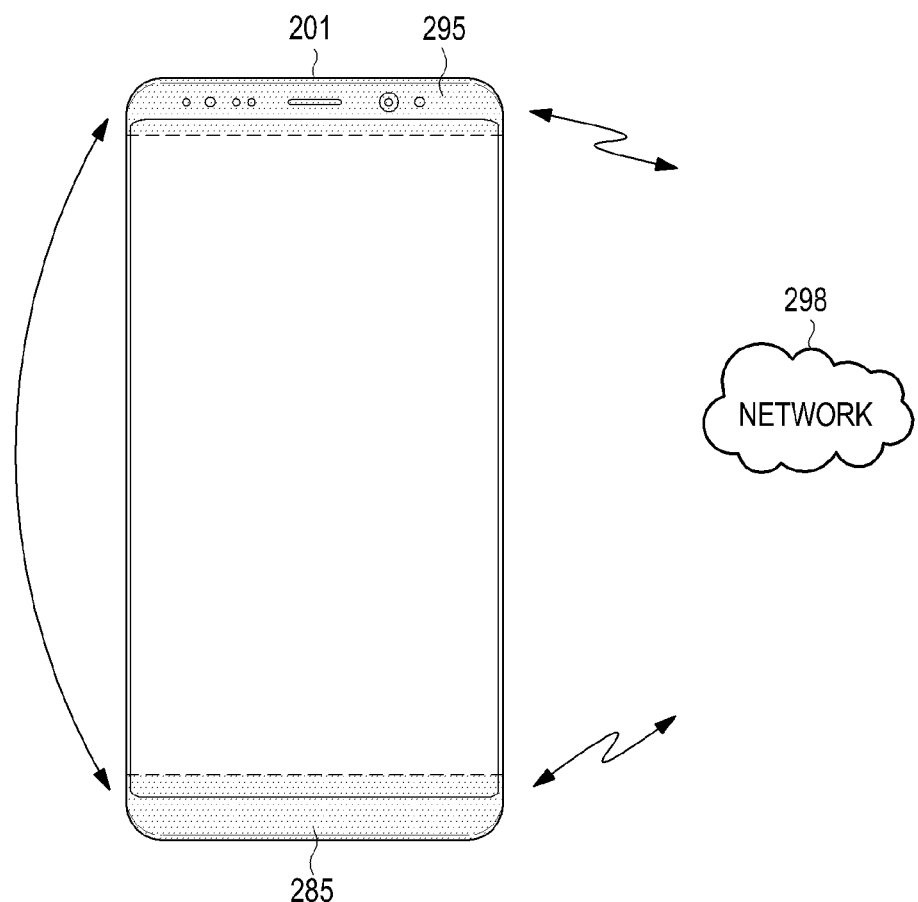
FIG. 2 is a schematic block diagram illustrating an electronic device according to various exemplary embodiments of the present disclosure.

FIG. 2 is a schematic block diagram illustrating an electronic device according to various exemplary embodiments.

Referring to FIG. 2, the electronic device 201 (e.g., the electronic device 101 of FIG. 1) may include a plurality of antennas. For example, the plurality of antennas may be included within a housing of the electronic device 201.

The electronic device 201 may transmit and receive data to or from a network 29 using at least one of the plurality of antennas.

The electronic device 201 may transmit a signal corresponding to data to the network 298 using at least one of the plurality of antennas.

The plurality of antennas may include a first antenna and a second antenna. For example, the first antenna may be located in a lower end portion 285 of the electronic device 201 (or the housing of the electronic device 201), and the second antenna may be located in an upper end portion 295 of the electronic device 201 (or the housing of the electronic device 201).

The performance of the antennas included in the electronic device 201 may deteriorate depending on external factors or internal factors. For example, when a user holds the electronic device 201, the performance of the first antenna located in the lower end portion 285 of the electronic device 201 may deteriorate.

According to various exemplary embodiments, when the performance of the first antenna is lower than a specified performance level, the electronic device 201 may transmit a signal, which is transmitted to the network 298 via the first antenna, to the network 298 via the second antenna. That is, the electronic device 201 may transmit the signal to the network 298 through the second antenna which has less performance deterioration.

Therefore, when the performance of the first antenna disposed in one area (e.g., the lower end portion 285) of the electronic device 201 deteriorates, the electronic device 201 may switch a path for a signal to the second antenna disposed in another area (e.g., the upper end portion 295) of the electronic device 201, thereby minimizing the loss of the signal transmitted to the network 298.

The electronic device 201 may transmit a signal corresponding to data to the network 298 using the plurality of antennas in order to improve the throughput of an uplink for transmitting data to the network 298. For example, the electronic device 201 may transmit a plurality of signals with a plurality of frequency bands corresponding to a plurality of different data to the network 298. For example, the electronic device 201 may provide uplink carrier aggregation by using the plurality of antennas connected to a plurality of ports.

The network 298 (e.g., the network 198 of FIG. 1) may transmit and receive data to and from the electronic device 201.

The network 298 may specify a frequency band (e.g., a low-frequency band, a medium-frequency band, or a high-frequency band) for a transmission signal relating to data transmitted by the electronic device 201. For example, the electronic device 201 may convert data to be transmitted into a signal in a frequency band specified by the network 298 according to the frequency band and may transmit the converted signal to the network 298.

The network 298 may provide uplink carrier aggregation. The electronic device 201 may convert first data and second data to be transmitted into signals (e.g., a Primary Component Carrier (PCC) and a Secondary Component Carrier (SCC)) corresponding to frequency bands (e.g., a low-frequency band, a medium-frequency band, and/or high-frequency band) specified by the network 298 according to the frequency bands and may transmit the converted signals to the network 298.

Figure 3A:
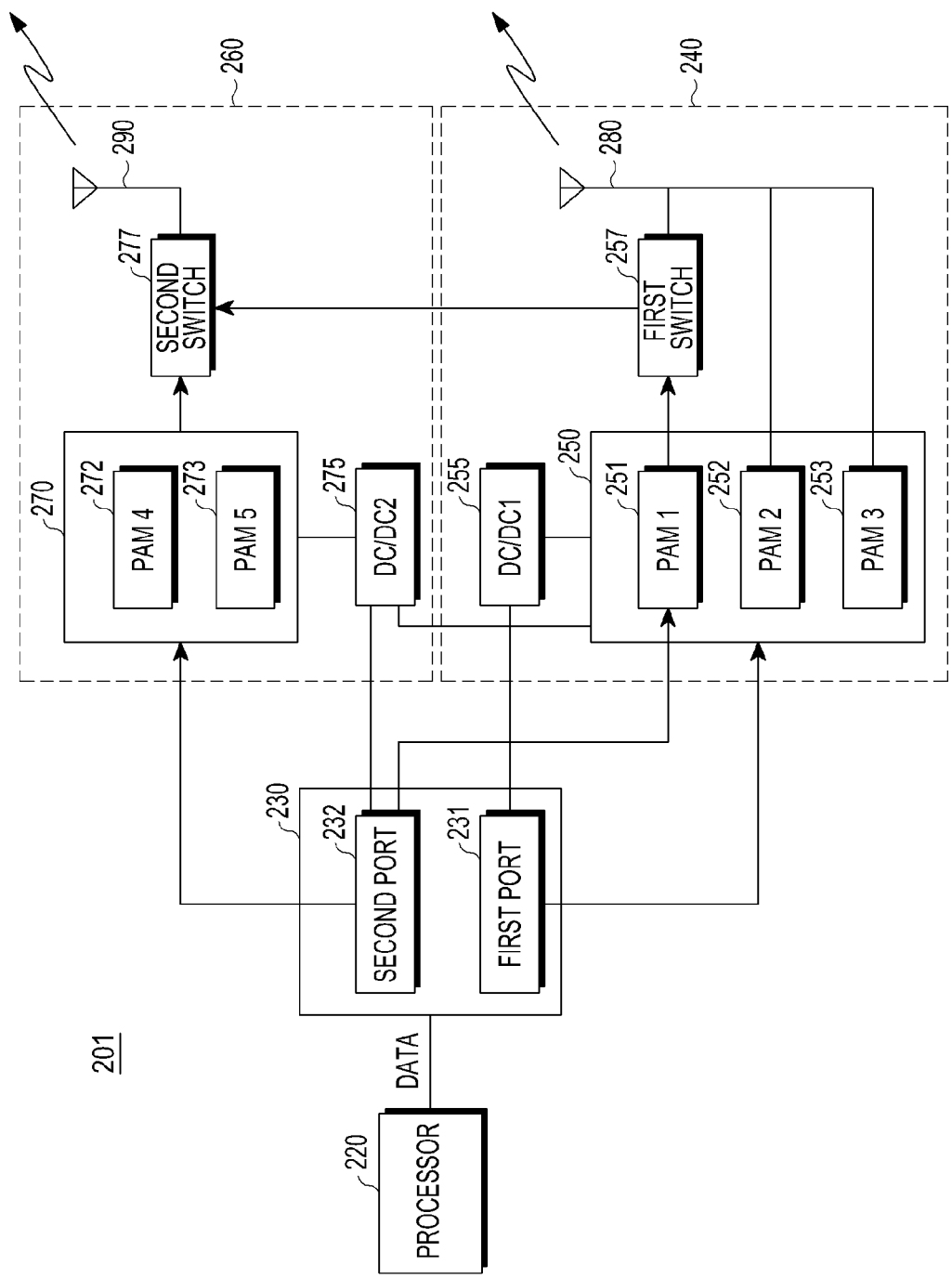
FIG. 3A is a detail block diagram illustrating an electronic device according to various exemplary embodiments of the present disclosure.

FIG. 3A is a detailed block diagram illustrating an electronic device according to various exemplary embodiments.

Referring to FIG. 3A, the electronic device 201 may include a processor 220, a transceiver 230, a first antenna module 240, and a second antenna module 260.

The processor 220 (e.g., the processor 120 of FIG. 1) may control the overall operations of the electronic device 201. For example, the processor 220 may include at least one of an Application Processor (AP) and a Communication Processor (CP).

The processor 220 may transmit, to the transceiver 230, data (DATA) to be transmitted to the network 298. For example, the data (DATA) may refer to data to be transmitted to the network 298 via an antenna. The data (DATA) may refer to digital data.

The transceiver 230 may convert the data (DATA) received from e processor 220 into a signal (e.g., an analog signal) and may output the signal.

The transceiver 230 may include a first port 231 and a second port 232. For example, the first port 231 and the second port 232 may output the signal corresponding to the data (DATA) received from the processor 220 to the antenna through an amplifier.

According to an exemplary embodiment, the processor 220 may transmit the data (DATA) to be transmitted to the network 298 to the first port 231 or the second port 232.

Hereinafter, for convenience of explanation, it is assumed that the data (DATA) includes a signal corresponding to data (DATA) output from the first port 231 or the second port 232. That is, the following description will be made assuming that the signal corresponding to the data (DATA) output from the first port 231 or the second port 232 is the data (DATA).

The processor 220 may output the data (DATA) from the first port 231 to the first antenna module 240.

The first antenna module 240 may transmit the data (DATA), received from the processor 220 via the first port 231, to the network 298. For example, the first antenna module 240 may be located in a lower end portion 285 of the electronic device 201.

The first antenna module 240 may include a first amplifier unit 250, a first power supplier 255, a first switch 257, and a first antenna 280.

The first amplifier unit 250 may include a first amplifier 251, a second amplifier 252, and a third amplifier 253. For example, the first amplifier 251, the second amplifier 252, and the third amplifier 253 may be configured as a Power Amplifier Module (PAM).

The first amplifier 251 may amplify a signal corresponding to a first frequency band and may output the amplified signal to the first antenna 280. For example, the first amplifier 251 may output a signal corresponding to a low-frequency band. For example, the low-frequency band may refer to a band corresponding to a frequency lower than 1 GHz.

The second amplifier 252 may amplify a signal corresponding to a second frequency band and may output the amplified signal to the first antenna 280. For example, the second amplifier 252 may output a signal corresponding to a medium-frequency band. For example, the medium-frequency band may refer to a band corresponding to a frequency ranging from 1 GHz to 2 GHz.

The third amplifier 253 may amplify a signal corresponding to a third frequency band and may output the amplified signal to the first antenna 280. For example, the third amplifier 253 may output a signal corresponding to a high-frequency band. The high-frequency band may refer to a band corresponding to a frequency 2 GHz or higher.

The processor 220 may output a signal corresponding to data (DATA) output from the first port 231 to the first amplifier unit 250. For example, the processor 220 may amplify the signal corresponding to the data (DATA) by using one of the first amplifier 251, the second amplifier 252, and the third amplifier 253 included in the first amplifier unit 250 and may output the amplified signal to the first antenna 280.

The processor 220 may output the data (DATA) output from the first port 231 to an amplifier corresponding to the frequency band of the data (DATA) among the first amplifier 251, the second amplifier 252, and the third amplifier 253. For example, when the data (DATA) corresponds to the low-frequency band, the processor 220 may output the signal to the first amplifier 251. When the data (DATA) corresponds to the medium-frequency band, the processor 220 may output the data (DATA) to the second amplifier 252. When the data (DATA) corresponds to the high-frequency band, the processor 220 may output the data (DATA) to the third amplifier 253.

The first power supplier 255 may supply power to the first amplifier unit 250. For example, the first power supplier 255 may be configured as a DC/DC converter. For example, the first power supplier 255 may supply power to at least one of the first amplifier 251, the second amplifier 252, and the third amplifier 253.

The first switch 257 may output data (DATA) output from the first amplifier 251 to the first antenna 280 or a second antenna 290.

The first antenna 280 may transmit the data (DATA) output from the first amplifier unit 250 to a network (e.g., the network 298 of FIG. 2). The first antenna 280 may be connected to the first port 231 through the first amplifier unit 250. For example, the first antenna 280 may transmit data (DATA) output from the first port 231 to the network 298.

The processor 220 may monitor a request for antenna switching. For example, antenna switching may refer to an operation for outputting a signal, which is to be output through the first antenna 280 among a plurality of antennas, through the second antenna 290 that has no (or less) performance deterioration among the plurality of antennas.

The processor 220 may monitor the performance (e.g., transmission performance) of the first antenna 280. When performance deterioration of the first antenna 280 is detected, the processor 220 may perform antenna switching to set data (DATA), which is to be transmitted to the network 298 via the first antenna 280, to be transmitted through the second antenna 290.

When antenna switching is required, the processor 220 may change the first path connected to the first antenna 280 through the first port 231 to a second path connected to the second antenna 290 through the second port 232. For example, the first path may refer to a path for outputting data (DATA) from the first port 231 to the first antenna 280 through the first amplifier unit 250, and the second path may refer to a path for outputting data (DATA) from the second port 232 to the second antenna 290 through a second amplifier unit 270.

When antenna switching is required, the processor 220 may block the first path and may set the second path at a specified time. Further, the processor 220 may set the second path while maintaining the first path.

When antenna switching is required, the processor 220 may output the data (DATA), which is output from the first port 231 to the first antenna module 240, to the second antenna module 260 through the second port 232.

The second antenna module 260 may transmit the data (DMA), received from the processor 220 via the second port 232, to the network 298. For example, the second antenna module 260 may be located in an upper end portion 295 of the electronic device 201.

The second antenna module 260 may include a second amplifier unit 270, a second power supplier 275, a second switch 277, and the second antenna 290.

The second amplifier unit 270 may include a fourth amplifier 272 and a fifth amplifier 273. For example, the fourth amplifier 272 and the fifth amplifier 273 may be configured as a Power Amplifier Module (PAM).

The fourth amplifier 272 may amplify a signal corresponding to the second frequency band and may output the amplified signal to the second antenna 290. For example, the fourth amplifier 272 may output a signal corresponding to the medium-frequency band. For example, the fourth amplifier 272 may output a signal corresponding to at least one frequency in the medium-frequency band.

The fifth amplifier 273 may amplify a signal corresponding to the third frequency band and may output the amplified signal to the second antenna 290. For example, the fifth amplifier 273 may output a signal corresponding to the high-frequency band. For example, the fifth amplifier 273 may output a signal corresponding to at least one frequency in the high-frequency band.

The fourth amplifier 272 and the fifth amplifier 273 may be located adjacent to the second antenna 290. The signals output from the fourth amplifier 272 and the fifth amplifier 273 may be output to the second antenna 290 with little or no loss.

The processor 220 may output data (DATA) output through the second port 232 to an amplifier corresponding to the frequency band of the data (DATA) among the fourth amplifier 272 and the fifth amplifier 273. For example, when the data (DATA) corresponds to the medium-frequency band, the processor 220 may output the data (DATA) to the fourth amplifier 272. When the data (DATA) corresponds to the high-frequency band, the processor 220 may output the data (DATA) to the fifth amplifier 273.

When antenna switching is required, the processor 220 may output the data (DATA), which is output from the first port 231, through the second port 232. The processor 220 may output the data (DATA) to the second amplifier unit 270. For example, the processor 220 may amplify the data (DATA) using any one of the fourth amplifier 272 and the fifth amplifier 273 included in the second amplifier unit 270 and may output the amplified data to the second antenna 290.

The second power supplier 275 may supply power to the second amplifier unit 270. For example, the second power supplier 275 may be configured as a DC/DC converter. For example, the second power supplier 275 may supply power to at least one of the fourth amplifier 272 and the fifth amplifier 273.

The second switch 277 may output data (DATA) output from the second amplifier unit 270 or the data (DATA) output from the first amplifier 251 to the second antenna 290.

The second antenna 290 may transmit, to the network 298, the data (DATA) output from the second amplifier unit 270. Further, the second antenna 290 may transmit, to the network 298, the data (DATA) output from the first amplifier 251 via the first switch 257. The second antenna 290 may be connected to the second port 232 through the second amplifier unit 270. For example, the second antenna 290 may transmit the data (DATA) output from the second port 232 to the network 298.

Figure 3B:
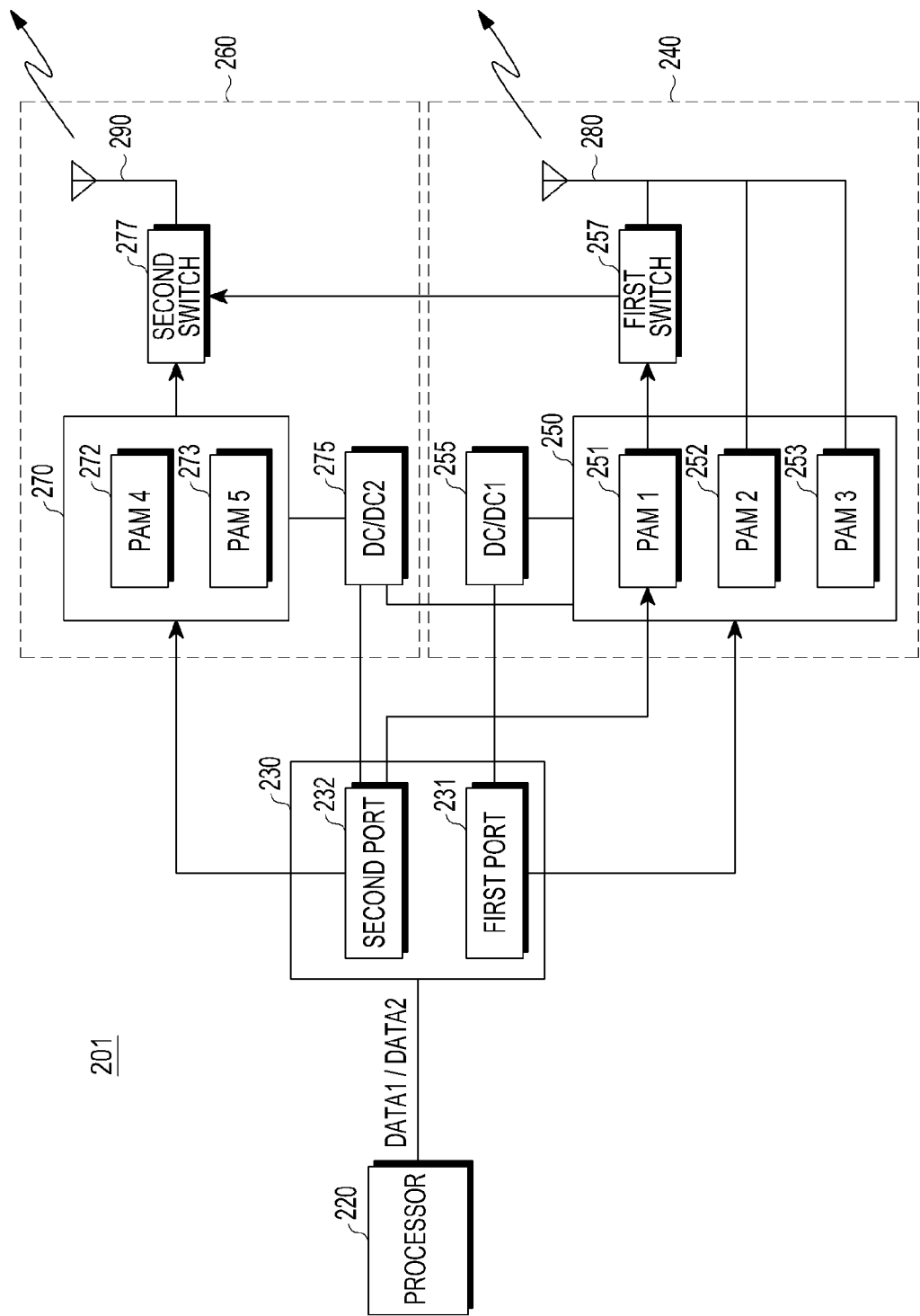
FIG. 3B is a detail block diagram illustrating an electronic device according to various exemplary embodiments of the present disclosure.

FIG. 3B is a detailed block diagram illustrating an electronic device according to various exemplary embodiments.

Referring to FIG. 3B, the electronic device 201 may include a processor 220, a transceiver 230, a first antenna module 240, and a second antenna module 260. The electronic device 201 of FIG. 3B may be configured to be substantially the same as or similar to the electronic device 201 illustrated in FIG. 3A.

The processor 220 may transmit first data (DATA1) and second data (DATA2) to a network 298 by using Uplink Carrier Aggregation (ULCA).

The processor 220 may transmit the first data (DATA1) and the second data (DATA2) to the transceiver 230. The first data (DATA1) and the second data (DATA2) may refer to data that is transmitted to the network 298 using ULCA. For example, the first data (DATA1) and the second data (DATA2) may be different from each other.

The processor 220 may transmit the first data (DATA1) and the second data (DATA2) to the transceiver 230. The first data (DATA1) and the second data (DATA2) may refer to data that is transmitted to the network 298 by using antenna diversity or transceiver diversity. For example, the first data (DATA1) and the second data (DATA2) may be the same data.

The processor 220 may transmit the first data (DATA1) and the second data (DATA2) to the network 298. The frequency band of a first signal corresponding to the first data (DATA1) may be different from the frequency band of a second signal corresponding to the second data (DATA2).

For example, the first data (DATA1) may refer to data input to a first port 231, and the second data (DATA2) may refer to data input to a second port 232. The first signal may refer to a signal corresponding to the first data (DATA1), and the second signal may refer signal corresponding to the second data (DATA2). For example, the first signal may be output from the first port 231, and the second signal may be output from the second port 232.

The processor 220 may output the first signal to a first antenna 280 through any one of a second amplifier 252 and a third amplifier 253.

The processor 220 may output the first signal to an amplifier corresponding to the frequency band of the first signal among the second amplifier 252 and the third amplifier 253. For example, when the frequency band of the first signal is a medium-frequency band, the processor 220 may output the first signal to the second amplifier 252. When the frequency band of the first signal is a high-frequency band, the processor 220 may output the first signal to the third amplifier 253.

The processor 220 may output the second signal to the first antenna 280 or a second antenna 290 through any one of a first amplifier 251, a fourth amplifier 272 and a fifth amplifier 273.

The processor 220 may output the second signal to an amplifier corresponding to the frequency band of the second signal among the first amplifier 251, the fourth amplifier 272, and the fifth amplifier 273. For example, when the frequency band of the second signal is a low-frequency band, the processor 220 may output the second signal to the first amplifier 251. When the frequency band of the second signal is the medium-frequency band, the processor 220 may output the second signal to the fourth amplifier 272. When the frequency band of the second signal is the high-frequency band, the processor 220 may output the second signal to the fifth amplifier 273.

According to various exemplary embodiments, the processor 220 may set the first signal as a Primary Component Carrier (PCC) and may set the second signal as a Secondary Component Carrier (SCC).

According to various exemplary embodiments, the processor 220 may set the first signal as an SCC and may set the second signal as a PCC.

The processor 220 may set the first signal as a PCC or an SCC according to a request from the network 298. In addition, the processor 220 may set the second signal as an SCC or a PCC according to a request from the network 298.

The processor 220 may simultaneously or sequentially transmit the first signal and the second signal to the network 298 using at least one of the first antenna 280 and the second antenna 290.

Figure 4:
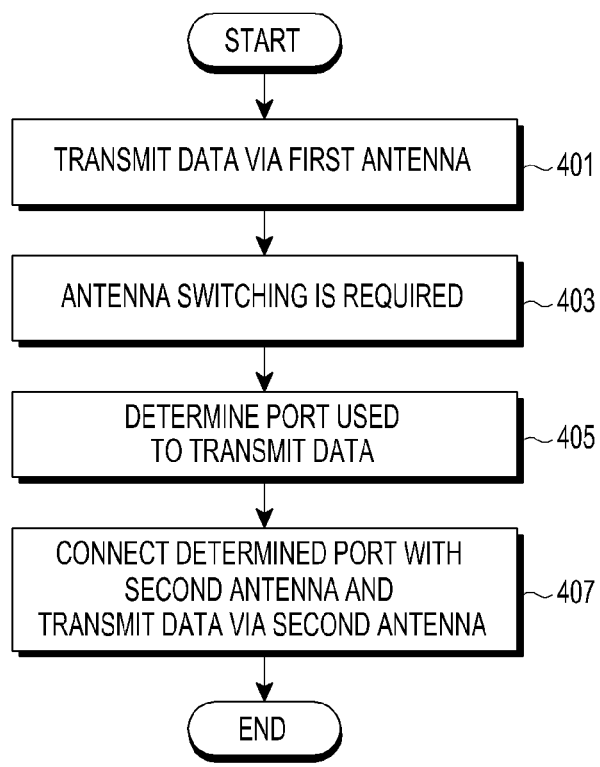
FIG. 4 is a flowchart illustrating antenna switching operation of an electronic device according to various exemplary embodiments of the present disclosure.

FIG. 4 is a flowchart illustrating antenna switching operation of an electronic device according to various exemplary embodiments.

Referring to FIG. 4, in operation 401, the electronic device (e.g., a processor (the processor 220 of FIG. 3A)) may transmit data (DATA) to a network 298 via a first antenna 280.

The processor 220 may monitor the performance of the first antenna 280. In operation 403, the electronic device (e.g., the processor 220) may determine that antenna switching is required on the basis of the performance of the first antenna 280. For example, when performance deterioration of the first antenna 280 is detected, the processor 220 may determine that antenna switching is required.

In operation 405, the electronic device (e.g., the processor 220) may determine a port used to transmit the data, which is transmitted to the network 298 through the first antenna 280. For example, the processor 220 may determine whether to switch the port used to transmit the data on the basis of the frequency band of a signal corresponding to the data.

In operation 407, the electronic device (e.g., the processor 220) may connect the determined port and a second antenna 290 and may transmit the data via the second antenna 290.

Figure 5:
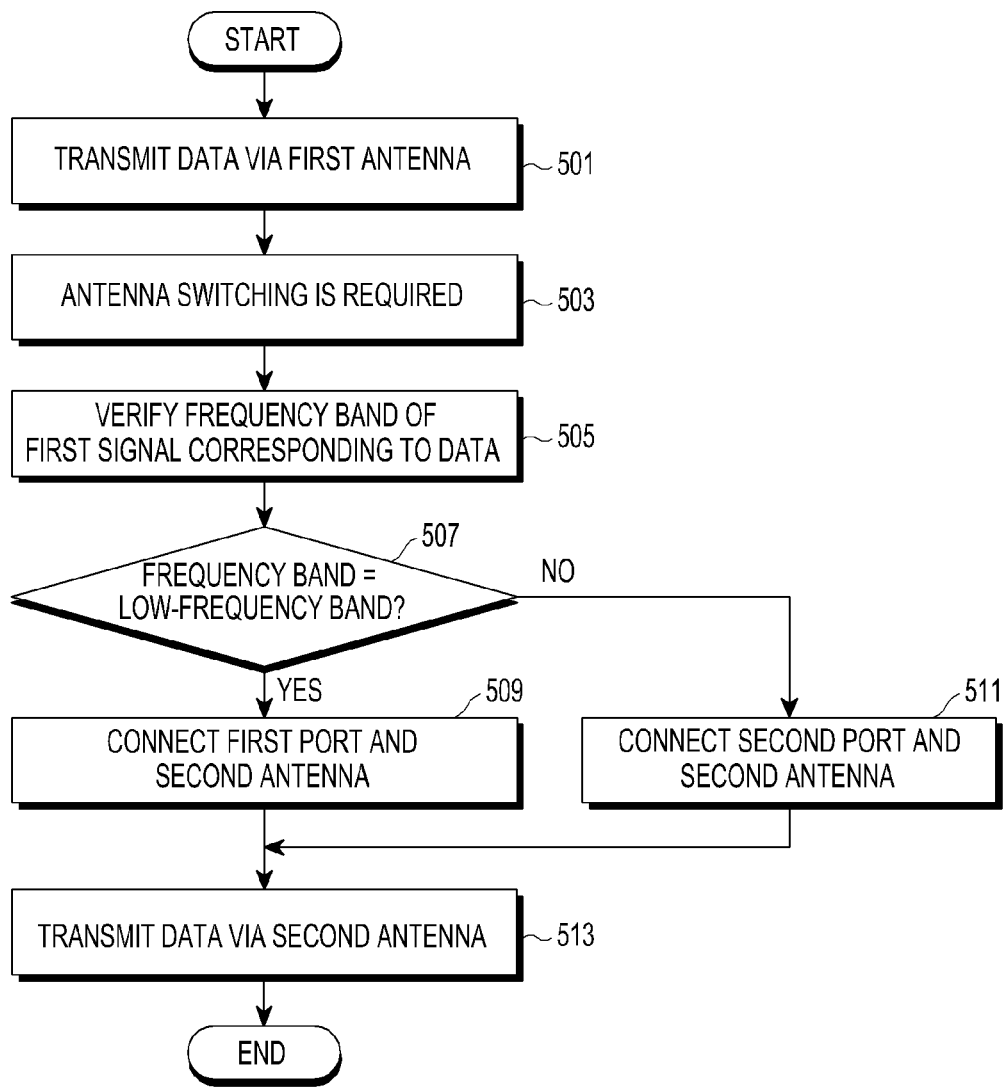
FIG. 5 is a flowchart illustrating the antenna switching operation of an electronic device according to various exemplary embodiments of the present disclosure.

FIG. 5 is a flowchart illustrating the antenna switching operation of an electronic device according to various exemplary embodiments.

Referring to FIG. 5, in operation 501, the electronic device (e.g., a processor (the processor 220 of FIG. 3A)) may transmit data (DATA) to a network 298 via a first antenna 280.

In operation 503, when performance deterioration of the first antenna 280 is detected, the electronic device (e.g., the processor 220) may need to switch antennas. For example, when a user holds or touches the electronic device 201 and causes deterioration in the performance of the first antenna 280, antenna switching to a second antenna 290 may be required.

In operation 505, the electronic device (e.g., the processor 220) may verify the frequency band of a first signal corresponding to the data (DATA). For example, the processor 220 may verify a frequency band for transmitting the data (DATA). For example, the frequency band for the data (DATA) may be specified by the network 298.

In operation 507, the electronic device (e.g., the processor 220) may verify whether the frequency band of the data (DATA) (or the signal corresponding to the data (DATA)) is a low-frequency band.

In operation 509, when the frequency band of the data (DATA) is a low-frequency band (Yes in operation 507), the electronic device (e.g., the processor 220) may connect a first port 231 and the second antenna 290 by using a first switch 257.

In operation 513, the electronic device (e.g., the processor 220) may transmit the data (DATA) to the network 298 via the second antenna 290 by using the first switch 257.

In operation 511, when the frequency of the data (DATA) is not a frequency band (No in operation 507), the electronic device (e.g., the processor 220) may connect a second port 232 and the second antenna 290. For example, the processor 220 may change the first path for transmitting the data (DATA) from the first port 231 to the first antenna 280 to a second path for transmitting the data (DATA) from the second port 232 to the second antenna 290.

The processor 220 may transmit the data (DATA), output from the second port 232, to the network 298 via the second antenna 290 in operation 513.

Figure 6:
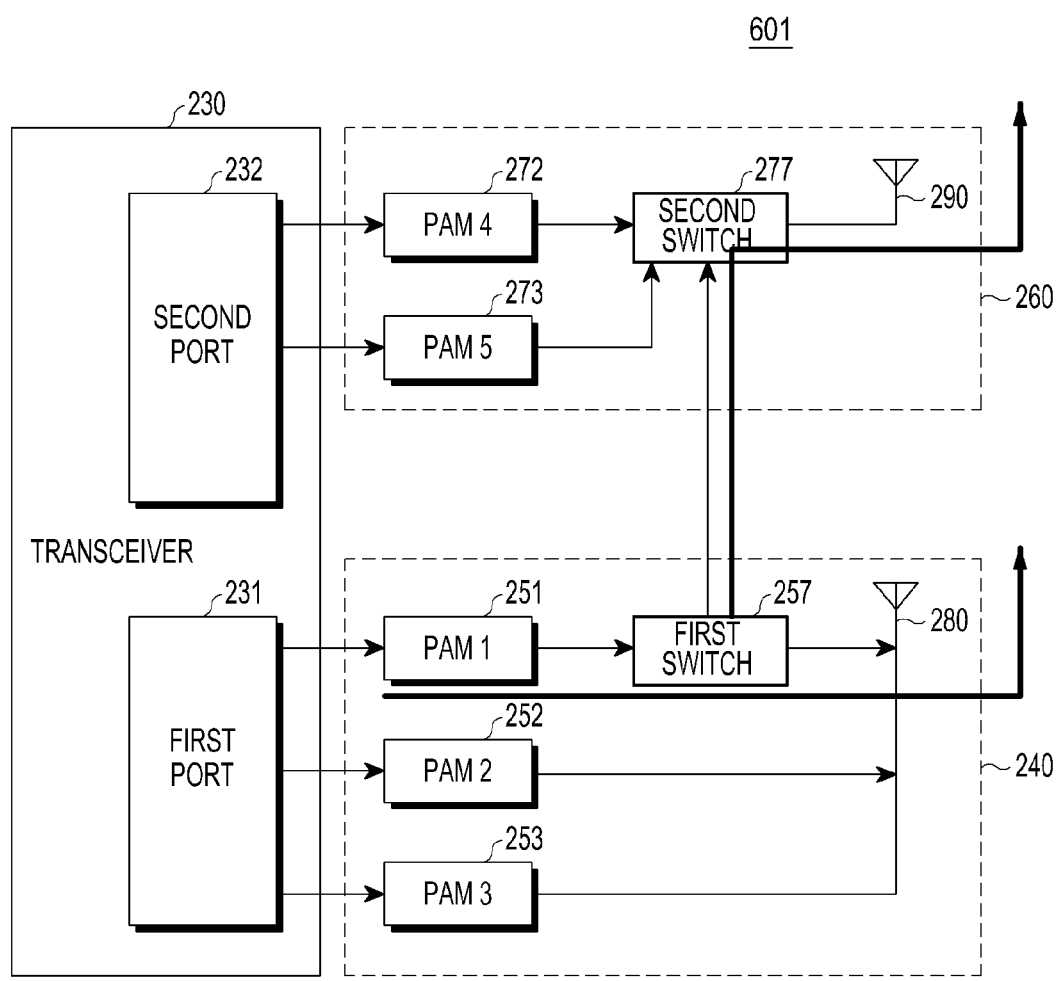
FIG. 6 is a block diagram illustrating an antenna switching operation for a signal in a low-frequency band according to various exemplary embodiments of the present disclosure.

FIG. 6 is a block diagram illustrating an antenna switching operation for a signal in a low-frequency band according to various exemplary embodiments.

Referring to FIG. 6, an electronic device 601 may be configured to be substantially the same as the electronic device 201 illustrated in FIG. 3A.

A processor 220 may transmit data (DATA) with a frequency in a low-frequency band to a network (e.g., the network 298 of FIG. 2) via a first antenna 280.

According to an exemplary embodiment, when performance deterioration of the first antenna 280 is detected, the processor 220 may perform antenna switching.

When antenna switching is required, the processor 220 may transmit the data (DATA), which is transmitted to the network 298 via the first antenna 280, to the network 298 via a second antenna 290. That is, the processor 220 may switch the antenna for transmitting the data (DATA) from the first antenna 280 to the second antenna 290.

When antenna switching is required, the processor 220 may connect a first port 231 and a second antenna 290 using a first switch 257 and a second switch 277. For example, the processor 220 may change the first path for transmitting the data (DATA) from the first port 231 to the first antenna 280 to a second path for transmitting the data (DATA) from the first port 231 to the second antenna 290.

The processor 220 may transmit the data (DATA) to the network 298 via the second antenna 290 using the first switch 257 and the second switch 277.

Figure 7:
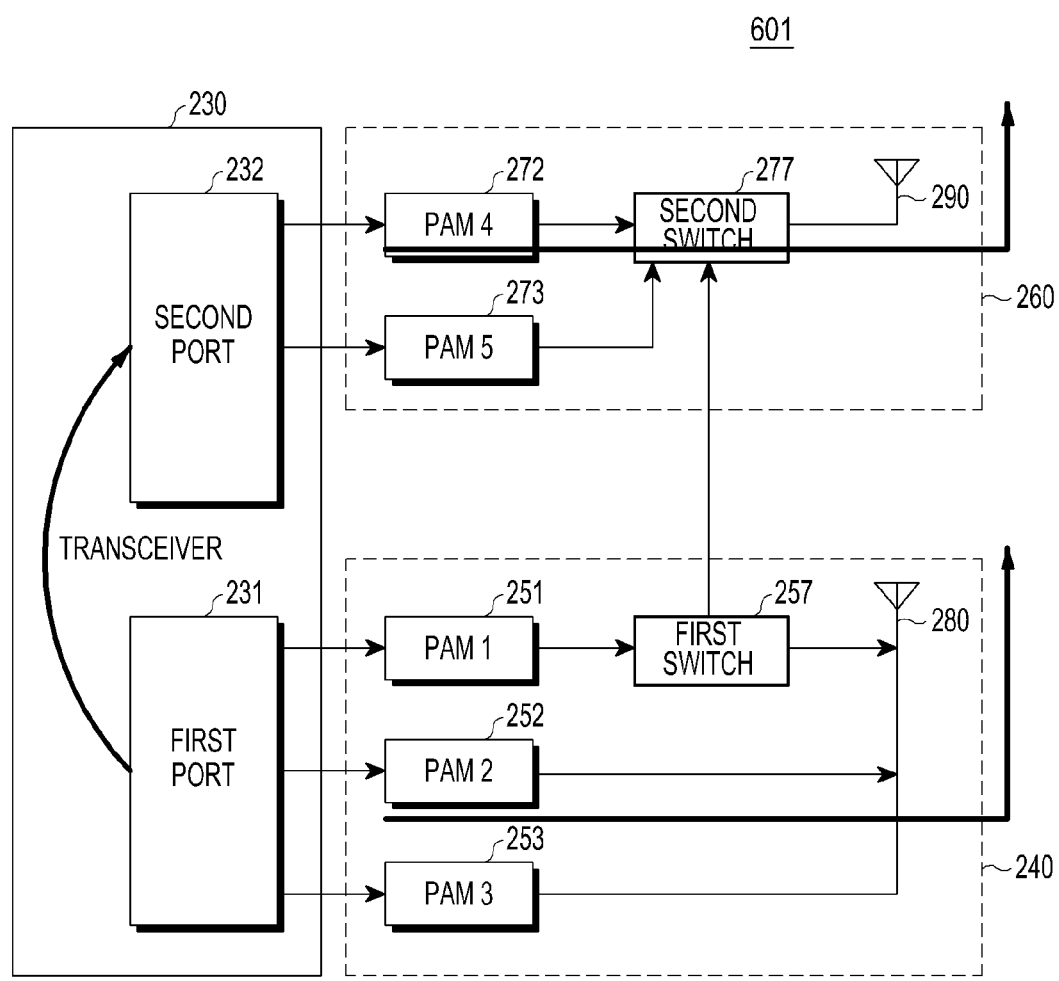
FIG. 7 is a block diagram illustrating an antenna switching operation for a signal in a medium-frequency band according to various exemplary embodiments of the present disclosure.

FIG. 7 is a block diagram illustrating an antenna switching operation for a signal in a medium-frequency band according to various exemplary embodiments.

Referring to FIG. 7, the processor 220 may transmit data (DATA) with a frequency in a medium-frequency band to the network 298 via the first antenna 280.

When performance deterioration of the first antenna 280 is detected, the processor 220 may perform antenna switching.

When antenna switching is required, the processor 220 may transmit data (DATA), which is transmitted to the network 298 via the first antenna 280, to the network 298 via a second antenna 290. That is, the processor 220 may switch the antenna for transmitting the data (DATA) from the first antenna 280 to the second antenna 290.

When antenna switching is required, the processor 220 may connect the second port 232 and the second antenna 290. For example, the processor 220 may change the first path for outputting the data (DATA) from the first port 231 to the first antenna 280 to a second path for outputting the data (DATA) from the second port 232 to the second antenna 290. When the second path is established, the processor 220 may output the data (DATA) via the second path.

The processor 220 may output a signal corresponding to the data (DATA) to a fourth amplifier 272 by using the second port 232. The processor 220 may transmit the data (DATA) in the medium-frequency band, which is amplified by the fourth amplifier 272, to the network 298 through the second antenna 290.

Figure 8:
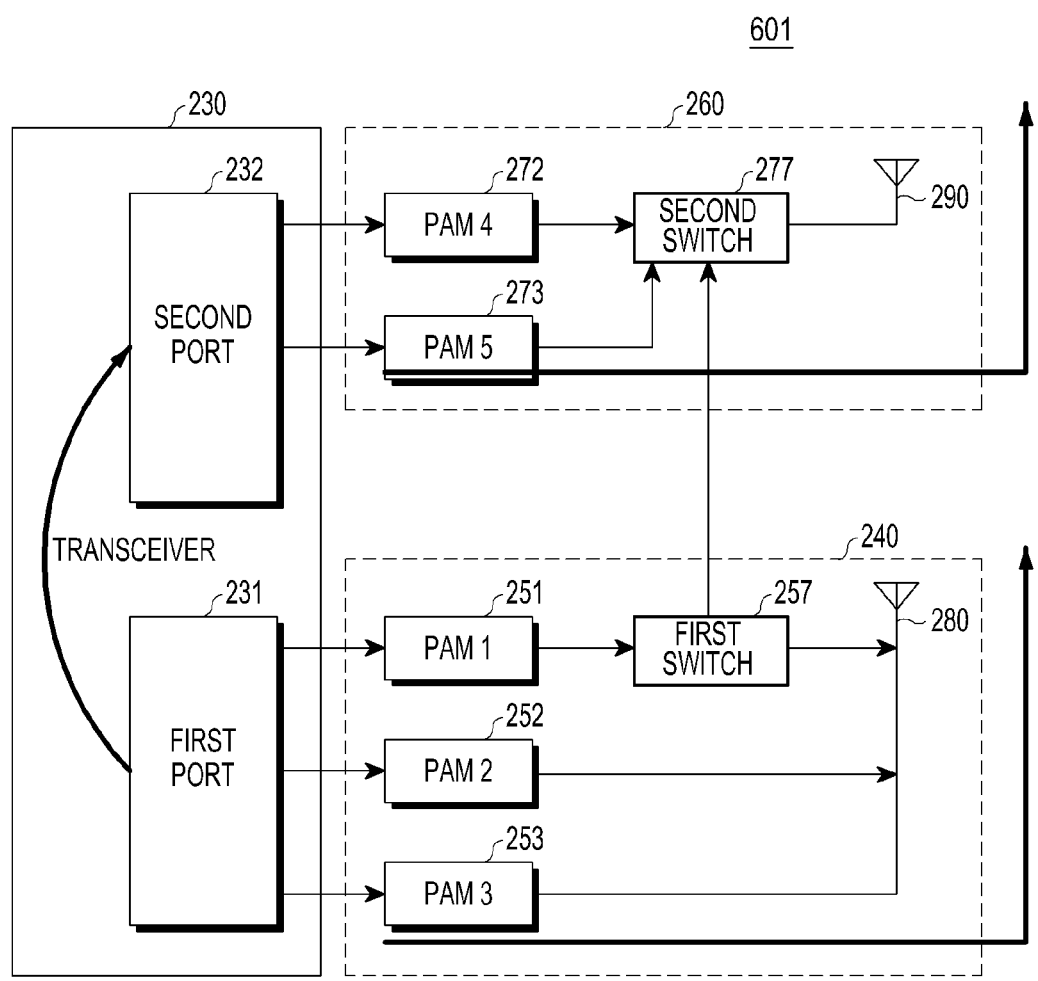
FIG. 8 is a block diagram illustrating an antenna switching operation for a signal in a high-frequency band according to various exemplary embodiments of the present disclosure.

FIG. 8 is a block diagram illustrating an antenna switching operation for a signal in a high-frequency band according to various exemplary embodiments.

Referring to FIG. 8, the processor 220 may transmit a signal in a high-frequency band to the network 298 via the first antenna 280.

When performance deterioration of the first antenna 280 is detected, the processor 220 may perform antenna switching.

When antenna switching is required, the processor 220 may transmit the data (DATA), which is transmitted to the network 298 via the first antenna 280, to the network 298 via a second antenna 290. That is, the processor 220 may switch the antenna for transmitting the data (DATA) from the first antenna 280 to the second antenna 290.

When antenna switching is required, the processor 220 may connect the second port 232 and the second antenna 290. For example, the processor 220 may change the first path for outputting the data (DATA) from the first port 231 to the first antenna 280 to a second path for outputting the data (DATA) from the second port 232 to the second antenna 290. When the second path is established, the processor 220 may output the data (DATA) via the second path.

The processor 220 may output the data (DATA) to a fifth amplifier 273 using the second port 232. The processor 220 may transmit the data (DATA) in the high-frequency band, which is amplified by the fifth amplifier 273, to the network 298 through the second antenna 290.

FIG. 9 is a table for explaining a method of comparing the performance of antennas according to various exemplary embodiments.

Referring to FIG. 9, a processor (the processor 220 of FIG. 3A) may compare the performance of a first antenna (the first antenna 280 of FIG. 3A) and the performance of a second antenna (the second antenna 290 of FIG. 3A). For example, the processor 220 may monitor the performances of the first antenna 280 and the second antenna 290 in real time or periodically, and may compare the performances of the first antenna 280 and the second antenna 290. Alternatively, when it is detected that an electronic device (the electronic device 201 of FIG. 2) is held by a user (or user's body part) (or when deterioration of an antenna (e.g., the first antenna 280) is detected), the processor 220 may compare the performances of the first antenna 280 and the second antenna 290.

According to an exemplary embodiment, the processor 220 may apply a specified conduction value (or conductive power value) to the first antenna 280 and the second antenna 290 and may measure the performance values (e.g., Wide Hand Phantom (WHP) values (TRP(Total Radiated Power))) of the first antenna 280 and the second antenna 290. The processor 220 may compare the performance values of the first antenna 280 and the second antennas 290 and may determine that an antenna with a higher performance value has better performance.

For example, the processor 220 may apply a first conduction value 901 for a first frequency band to the first antenna 280 and the second antenna 290. The processor 220 may measure the performance value 903 of the first antenna 280 and the performance value 902 of the second antenna 290. The processor 220 may compare the performance value 903 of the first antenna 280 with the performance value 902 of the second antenna 290. For example, since the performance value 902 of the second antenna 290 is higher than the performance value 903 of the first antenna 280, the processor 220 may determine that the second antenna 290 has better performance.

The processor 220 may determine whether switching between the first antenna 280 and the second antenna 290 is required on the basis of the difference 904 between the performance values of the first antenna 280 and the second antenna 290 for the first frequency band. For example, when the difference 904 between the performance values of the first antenna 280 and the second antenna 290 is a specified value or greater, the processor 220 may determine that switching between the first antenna 280 and the second antenna 290 is required. Specifically, when a difference in performance value corresponding to a 6 dB noise occurs, the processor 220 may determine that switching between the first antenna 280 and the second antenna 290 is required.

Likewise, the processor 220 may apply a second conduction value 911 for a second frequency band to the first antenna 280 and the second antenna 290. The processor 220 may measure the performance value 913 of the first antenna 280 and the performance value 912 of the second antenna 290. The processor 220 may compare the performance value 913 of the first antenna 280 with the performance value 912 of the second antenna 290. For example, since the performance value 912 of the second antenna 290 is higher than the performance value 913 of the first antenna 280, the processor 220 may determine that the second antenna 290 has better performance.

The processor 220 may determine whether switching between the first antenna 280 and the second antenna 290 is required on the basis of the difference 914 between the performance values of the first antenna 280 and the second antenna 290 for the second frequency band. For example, when the difference 914 between the performance values of the first antenna 280 and the second antenna 290 is a specified value or greater, the processor 220 may determine that switching between the first antenna 280 and the second antenna 290 is required. Specifically, when a difference in performance value corresponding to a 6 dB noise occurs, the processor 220 may determine that switching between the first antenna 280 and the second antenna 290 is required.

For example, when switching occurs from the first antenna 280 to the second antenna 290 for the first frequency band, an improvement in performance value of 1.4 (WHP TRP) may be achieved with a conduction value of 23.5, an improvement in performance value of 0.7 (WHP TRP) may be achieved with a conduction value of 23.7, and an improvement in performance value of 2.4 (WHP TRP) may be achieved with a conduction value of 23.6.

When switching occurs from the first antenna 280 to the second antenna 290 for the second frequency band, an improvement in performance value of 2.3 (WHP TRP) may be achieved with a conduction value of 23.5, an improvement in performance value of 1.3 (WHP TRP) may be achieved with a conduction value of 23.8, and an improvement in performance value of 0.8 (WHP TRP) may be achieved with a conduction value of 23.7.

Accordingly, when the performance of the first antenna 280 provided in one area of the electronic device 201 deteriorates, the processor 220 may switch a path for a signal to the second antenna 290 provided in another area of the electronic device 201, thereby reducing the loss of a signal transmitted to a network 298.

Figure 10:
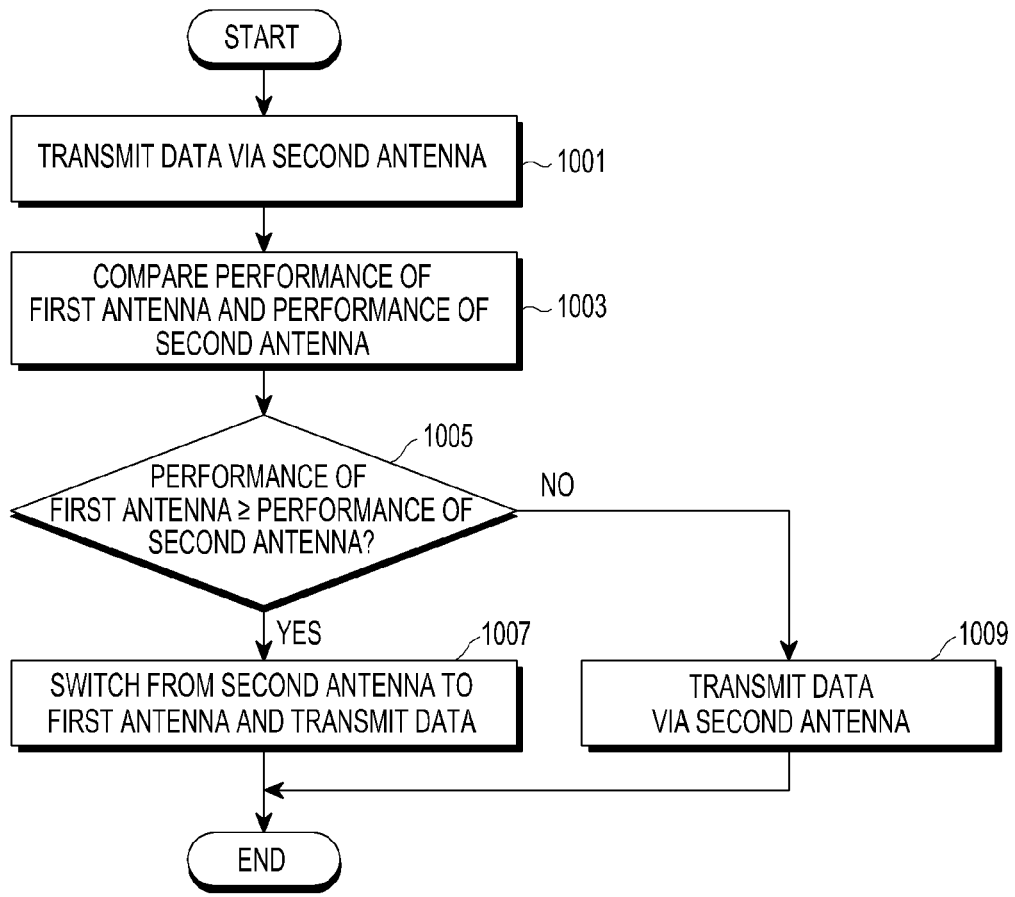
FIG. 10 is a flowchart illustrating the antenna switching operation of an electronic device according to various exemplary embodiments of the present disclosure.

FIG. 10 is a flowchart illustrating the antenna switching operation of an electronic device according to various exemplary embodiments.

Referring to FIG. 10, in operation 1001, a processor (the processor 220 of FIG. 3A) may transmit data (DATA) to a network 298 via a second antenna 290 according to the antenna switching operation.

In operation 1003, the processor 220 may compare the performance of a first antenna 280 and the performance of the second antenna 290. For example, the processor 220 may monitor the performances of the first antenna 280 and the second antenna 290 in real time or periodically and may compare the performances of the first antenna 280 and the second antenna 290.

When the performance of the first antenna 280 is better than (or is equal to) the performance of the second antenna 290 (Yes in operation 1005), the processor 220 may switch the antenna for transmitting the data (DATA) to the network 298 from the second antenna 290 to the first antenna 280 in operation 1007. Further, the processor 220 may transmit the data (DATA) to the network 298 via the first antenna 280 in operation 1007.

When the performance of the first antenna 280 is not better than (or is not equal to) the performance of the second antenna 290 (No in operation 1005), the processor 220 may transmit the data (DATA) to the network through the second antenna 290 in operation 1009.

Figure 11:
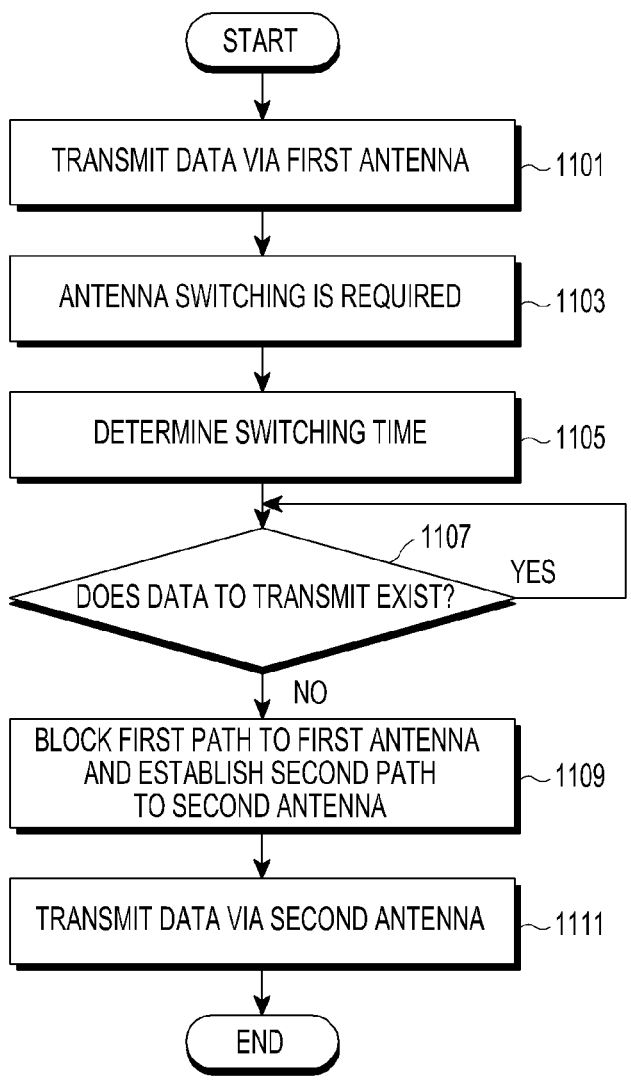
FIG. 11 is a flowchart illustrating the antenna switching operation of an electronic device according to various exemplary embodiments of the present disclosure.

FIG. 11 is a flowchart illustrating the antenna switching operation of an electronic device according to various exemplary embodiments.

Referring to FIG. 11, in operation 1101, a processor (the processor 220 of FIG. 3A) may transmit data (DATA) to a network 298 via a first antenna 280.

In operation 1103, when performance deterioration of the first antenna 280 is detected, the processor 220 may determine that antenna switching is required. For example, the processor 220 may switch the antenna for transmitting the data (DATA) to the network 298 from the first antenna 280 to a second antenna 290.

The processor 220 may verify the frequency band of the data (DATA). For example, when the frequency band of the data (DATA) is a low-frequency band, the processor 220 may immediately connect a first port 231 to the second antenna 290 through a first switch 257. The processor 220 may output the data (DATA) from the first port 231 to the second antenna 290, thereby transmitting the data (DATA) to the network 298 via the second antenna 290.

When the frequency band of the data (DATA) is not a low-frequency band, the processor 220 may determine the time to switch from the first antenna 280 to the second antenna 290 in operation 1105.

In operation 1107, the processor 220 may determine whether there is data to be transmitted to the network 298 in a first transfer time interval (TTI) (or current TTI) corresponding to a current time and a second TTI (or next TTI) following the current TTI) corresponding to the next time following the current time. For example, the current time may refer to a TTI corresponding to the current time, and the next time may refer to a TTI following the current TTI. That is, the processor 220 may determine whether data to be transmitted to the network 298 is assigned for the first TTI and the second TTI following the first TTI.

When there is data to be transmitted to the network 298 in the current time (e.g., the first TTI) and the next time (e.g., the second TTI following the first TTI) (Yes in operation 1107), the processor 220 may wait until there is no data to be transmitted to the network 298 in the current time (e.g., the first TTI) and the next time (e.g., the second TTI).

When there is no data to be transmitted to the network 298 in the current time (e.g., the first TTI) and the next time (e.g., the second TTI) (No in operation 1107), the processor 220 may start antenna switching.

In operation 1109, the processor 220 may block the first path from the first port 231 to the first antenna 280 and may establish a second path from the second port 232 to the second antenna 290.

When the second path is completely established, the processor 220 may output the data (DATA) from the second port 232 to the second antenna 290 and may transmit the data (DATA) to the network 298 via the second antenna 290 in operation 1111.

Figure 12:
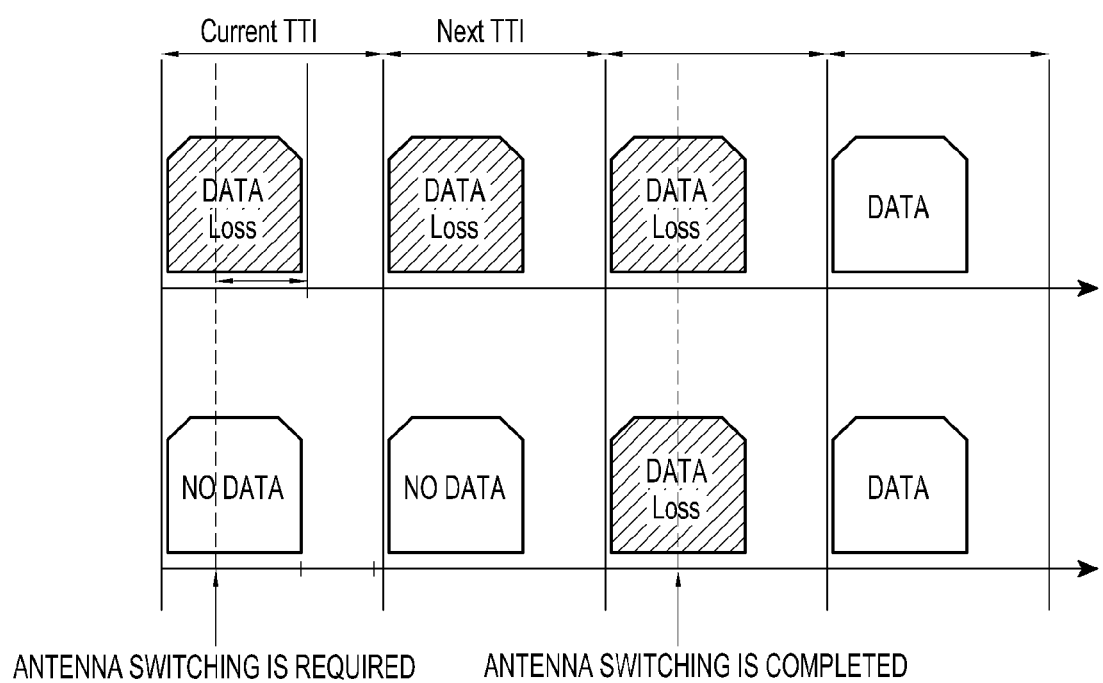
FIG. 12 is a graph illustrating the antenna switching operation of an electronic device according to various exemplary embodiments of the present disclosure.

FIG. 12 is a graph illustrating the antenna switching time of an electronic device according to various exemplary embodiments.

Referring to FIG. 12, when antenna switching is required, a processor 220 may determine the time to switch from a first antenna 280 to a second antenna 290.

The processor 220 may determine the time to switch from the first antenna 280 to the second antenna 290 on the basis of whether there is data to be transmitted to a network 298 in a first TTI (e.g., a current TTI) corresponding to a current time and a second TTI (e.g., a next TTI following the current TTI) corresponding to the next time following the current time. For example, it may take 2 ms to 3 ms to switch from the first antenna 280 to the second antenna 290.

The processor 220 may determine whether data to be transmitted to the network 298 exists (or is assigned) for the current time (e.g., the first TTI or the current TTI) and the next time (e.g., the second TTI or the next TTI). For example, time allocated for the processor 220 to transmit one piece of data may be 1 ms.

When there is no data to be transmitted to the network 298 in the current time (e.g., the current TTI) and the next time (e.g., the next TTI), the processor 220 may start antenna switching. Further, when there is no data to be transmitted to the network 298 for a specified period of time (e.g., 2 ms), the processor 220 may start antenna switching.

When there is data to be transmitted to the network 298 in at least one of the current TTI and the next TTI, the processor 220 may wait to start antenna switching until there is no data to be transmitted to the network 298 in the current TTI and the next TTI.

For example, when antenna switching is performed without determining whether there is data to be transmitted to the network 298 in the current TTI and the next TTI, up to three pieces of data may be lost due to the antenna switching operation.

However, when antenna switching is performed on the basis of whether there is data to be transmitted to the network 298 in the current TTI and the next TTI, only up to one piece of data may be lost.

Figure 13:
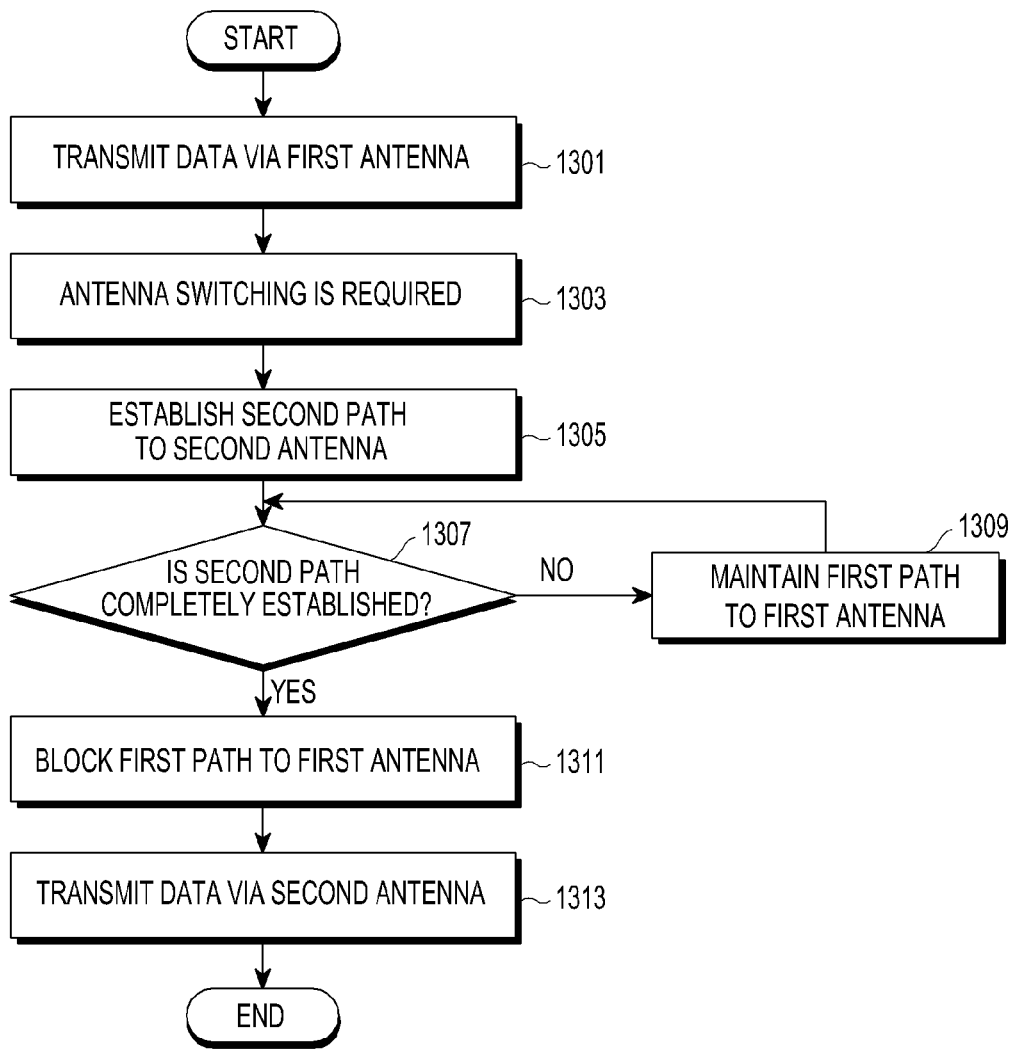
FIG. 13 is a flowchart illustrating the antenna switching time of an electronic device according to various exemplary embodiments of the present disclosure.

FIG. 13 is a flowchart illustrating the antenna switching operation of an electronic device according to various exemplary embodiments.

Referring to FIG. 13, in operation 1301, a processor (the processor 220 of FIG. 3A) may transmit data (DATA) to a network 298 via a first antenna 280.

In operation 1303, when performance deterioration of the first antenna 280 is detected, the processor 220 may determine that antenna switching is required. For example, the processor 220 may switch the antenna for transmitting the data (DATA) to the network 298 from the first antenna 280 to a second antenna 290.

The processor 220 may verify the frequency band of the data (DATA). For example, when the frequency band of the data (DATA) is a low-frequency band, the processor 220 may immediately connect a first port 231 to the second antenna 290 through a first switch 257. The processor 220 may output the data (DATA) from the first port 231 to the second antenna 290, thereby transmitting the data (DATA) to the network 298 via the second antenna 290.

When the frequency band of the data (DATA) is not a low-frequency band, the processor 220 may establish a second path from a second port 232 to the second antenna 290 in operation 1305.

In operation 1307, the processor 220 may determine whether the second path is completely established.

When the second path is not completely established, the processor 220 may maintain the first path from the first port 231 to the first antenna 280 until the second path is completely established in operation 1309.

When the second path is completely established, the processor 220 may block the first path from the first port 231 to the first antenna 280 in operation 1311. For example, the processor 220 may transmit the same data (DATA) to the network 298 through each of: the first antenna 280 corresponding to the first path and the second antenna 290 corresponding to the second path until the first path is blocked.

In operation 1313, the processor 220 may output the data (DATA) from the second port 232 to the second antenna 290 and may transmit the data (DATA) to the network 298 via the second antenna 290.

Figure 14:
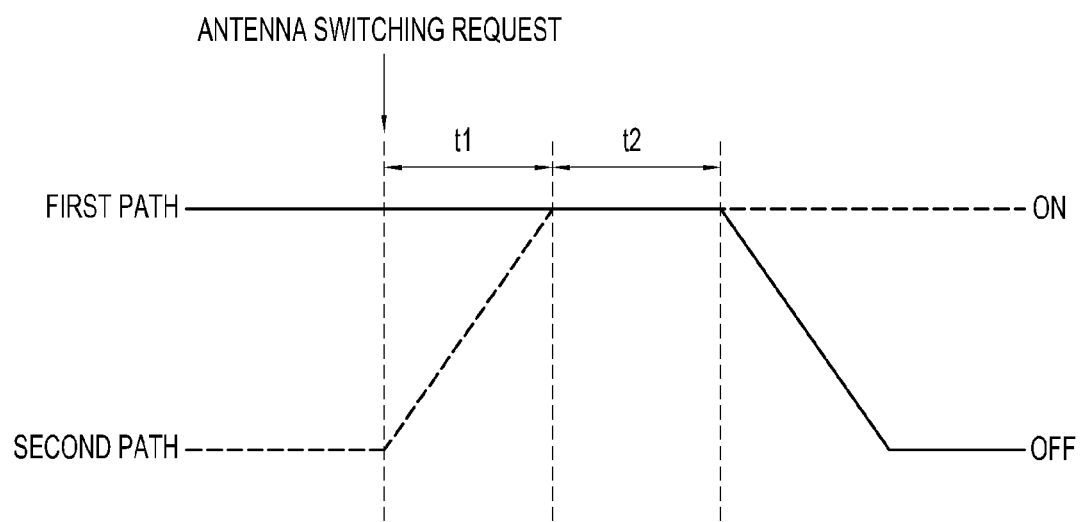
FIG. 14 is a graph illustrating the antenna switching time of an electronic device according to various exemplary embodiments of the present disclosure.

FIG. 14 is a graph illustrating the antenna switching time of an electronic device according to various exemplary embodiments.

Referring to FIG. 14, when antenna switching is required (or requested), a processor 220 may newly establish a second path from a second port 232 to a second antenna 290. Here, the processor 220 may maintain an existing first path for outputting data (DATA) from a first port 231 to a first antenna 280 instead of blocking the first path. That is, the processor 220 may output the data (DATA) to the first antenna 280 through the existing first path.

The processor 220 may determine whether the second path is completely established. The processor 220 may take a certain period of time (e.g., t1) to completely establish the second path.

The processor 220 may maintain the existing first path and may output the data (DATA) to the first antenna 280 through the first path until the second path is completely established.

The processor 220 may activate both the first path and the second path for a specified time (e.g., t2) even though the second path is completely established. The processor 220 may transmit the same data (DATA) to a network 298 via the first antenna 280 connected to the first path and the second antenna 290 connected to the second path for the specified time (t2). Here, the network 298 may receive two pieces of the same data (DATA) from the first antenna 280 and the second antenna 290.

When the second path is completely established (or the specified time (t2) elapses), the processor 220 may block the first path from the first port 231 to the first antenna 280. When the first path is completely blocked, the processor 220 may complete the antenna switching operation.

When the antenna switching operation is completed, the processor 220 may output the data (DATA) from the second port 232 to the second antenna 290 and may transmit the data (DATA) to the network 298 via the second antenna 290.

Figure 15:
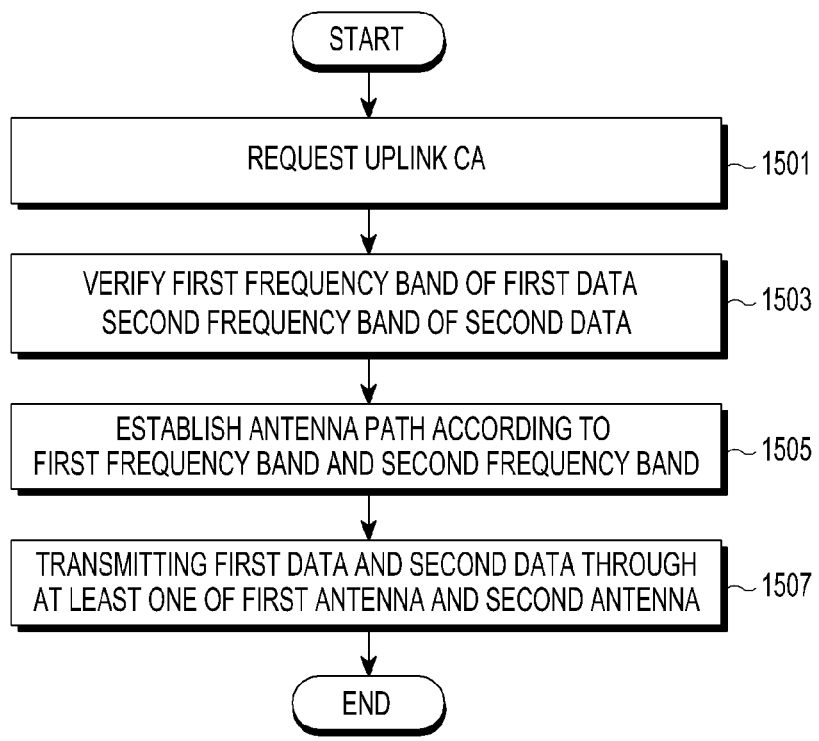
FIG. 15 is a flowchart illustrating the uplink carrier aggregation operation of an electronic device according to various exemplary embodiments of the present disclosure.

FIG. 15 is a flowchart illustrating the uplink carrier aggregation operation of an electronic device according to various exemplary embodiments.

Referring to FIG. 15, in operation 1501, a processor 220 may start (or perform) uplink Carrier Aggregation (CA) in response to an uplink CA request.

In operation 1503, the processor 220 may verify the first frequency band of first data (DATA1) and the second frequency band of second data (DATA2).

In operation 1505, the processor 220 may establish a path to an antenna for transmitting each of the first data (DATA1) and the second data (DATA2) to a network 298 according to the first frequency band and the second frequency band.

In operation 1507, the processor 220 may transmit the first data (DATA1) and the second data (DATA2) to the network 298 through at least one of a first antenna 280 and a second antenna 290 according to the established path.

Figure 16:
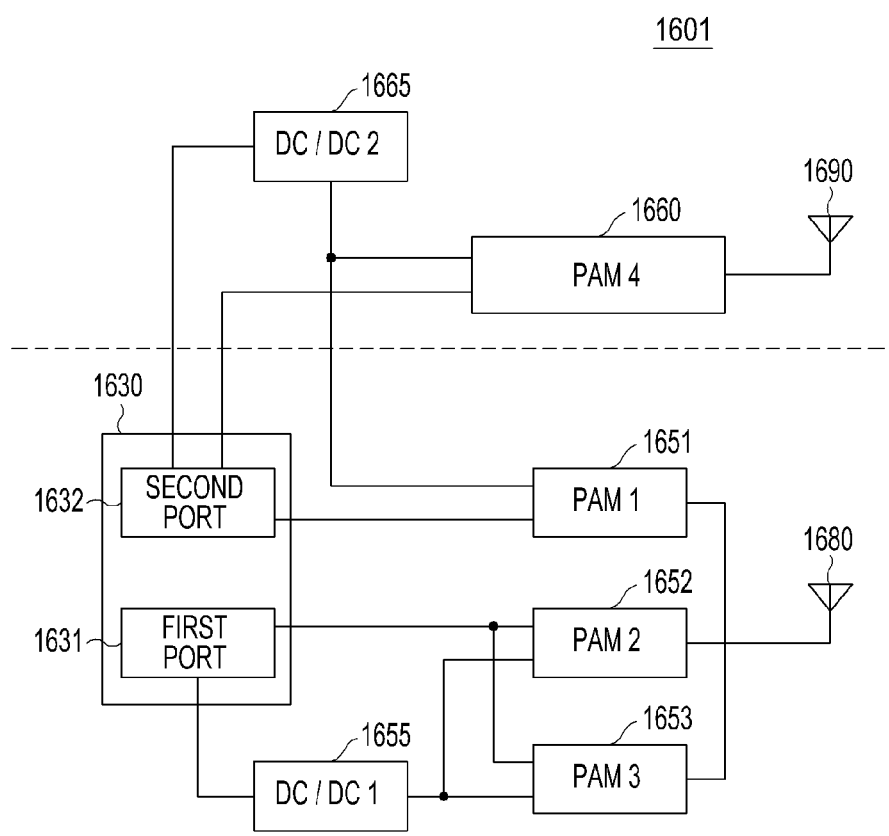
FIG. 16 is a schematic block diagram illustrating an electronic device that performs an uplink carrier aggregation operation according to various exemplary embodiments of the present disclosure.

FIG. 16 is a schematic block diagram illustrating an electronic device that performs an uplink CA operation according to various exemplary embodiments.

Referring to FIG. 16, the electronic device 1601 may be configured to be substantially the same as, or similar to, the electronic device 201 illustrated in FIG. 3B.

The electronic device 1601 may include a transceiver 1630, a first amplifier 1651, a second amplifier 1652, a third amplifier 1653, a first power supplier 1655, a fourth amplifier 1660, a second power supplier 1665, a first antenna 1680, and a second antenna 1690.

The transceiver 1630, the first amplifier 1651, the second amplifier 1652, the third amplifier 1653, the first power supplier 1655, and the first antenna 1680 may be disposed in a lower end portion of the electronic device 1601. In addition, the fourth amplifier 1660, the second power supplier 1665, and the second antenna 1690 may be disposed in an upper end portion of the electronic device 1601.

The transceiver 1630 may include a first port 1631 and a second port 1632.

A processor (e.g., the processor 220 of FIG. 3A) may output first data (DATA1) through the first port 1631 and may output second data (DATA2) through the second port 1632.

The first port 1631 may be connected to the second amplifier 1652 and the third amplifier 1653.

The second port 1632 may be connected to the first amplifier 1651 and the fourth amplifier 1660.

The first amplifier 1651 may perform the same function as the first amplifier 251 of FIG. 3B. For example, the first amplifier 1651 may amplify a signal in a low-frequency band.

The second amplifier 1652 may perform the same function as the second amplifier 252 of FIG. 3B. For example, the second amplifier 1652 may amplify a signal in a medium-frequency band.

The third amplifier 1653 may perform the same function as the third amplifier 253 of FIG. 3B. For example, the third amplifier 1653 may amplify a signal in a high-frequency band.

The fourth amplifier 1660 may perform the same function as the fourth amplifier 272 and the fifth amplifier 273 of FIG. 3B. For example, the fourth amplifier 1660 may amplify a signal in the medium-frequency band and a signal in the high-frequency band.

The first power supplier 1655 may supply power to the second amplifier 1652 and the third amplifier 1653. For example, the first power supplier 1655 may be configured as a DC/DC converter.

The second power supplier 1665 may supply power to the first amplifier 1651 and the fourth amplifier 1660. For example, the second power supplier 1665 may be configured as a DC/DC converter.

The processor 220 may output the first data (DATA1) to the second amplifier 1652 or the third amplifier 1653 through the first port 1631 on the basis of the frequency band of the first data (DATA1). For example, when the first data (DATA1) is set to the medium-frequency band, the processor 220 may output the first data (DATA1) to the second amplifier 1652. When the first data (DATA1) is set to the high-frequency band, the processor 220 may output the first data (DATA1) to the third amplifier 1653.

The processor 220 may output the second data (DATA2) to the first amplifier 1651 or the fourth amplifier 1660 through the second port 1632 on the basis of the frequency band of the second data (DATA2). For example, when the second data (DATA2) is set to the low-frequency band, the processor 220 may output the second data (DATA2) to the first amplifier 1651. When the second data (DATA2) is set to the medium-frequency band or the high-frequency band, the processor 220 may output the second data (DATA2) to the fourth amplifier 1660.

The processor 220 may transmit the first data (DATA1) and/or the second data (DATA2), output from at least one of the first amplifier 1651, the second amplifier 1652, and the third amplifier 1653, to a network 298 via the first antenna 1680.

The processor 220 may transmit the second data (DATA2) output from the fourth amplifier 1660 to the network 298 via the second antenna 1690.

FIGS. 17A to 17D are block diagrams illustrating the uplink carrier aggregation operation of an electronic device according to various exemplary embodiments.

Referring to FIGS. 17A to 17D, the electronic device 1601 may be configured to be substantially the same as or similar to the electronic device 1601 illustrated in FIG. 16.

A processor 220 may transmit first data (DATA1) and second data (DATA2) to a network 298 using different frequency bands. The network 298 may specify frequency bands for the first data (DATA1) and the second data (DATA2). In addition, the network 298 may specify the first data (DATA1) and the second data (DATA2) as a PCC and an SCC.

The electronic device 1601 may simultaneously transmit the first data (DATA1) and the second data (DATA2) to the network 298 by using different frequency bands, thereby providing uplink carrier aggregation.

Figure 17A:
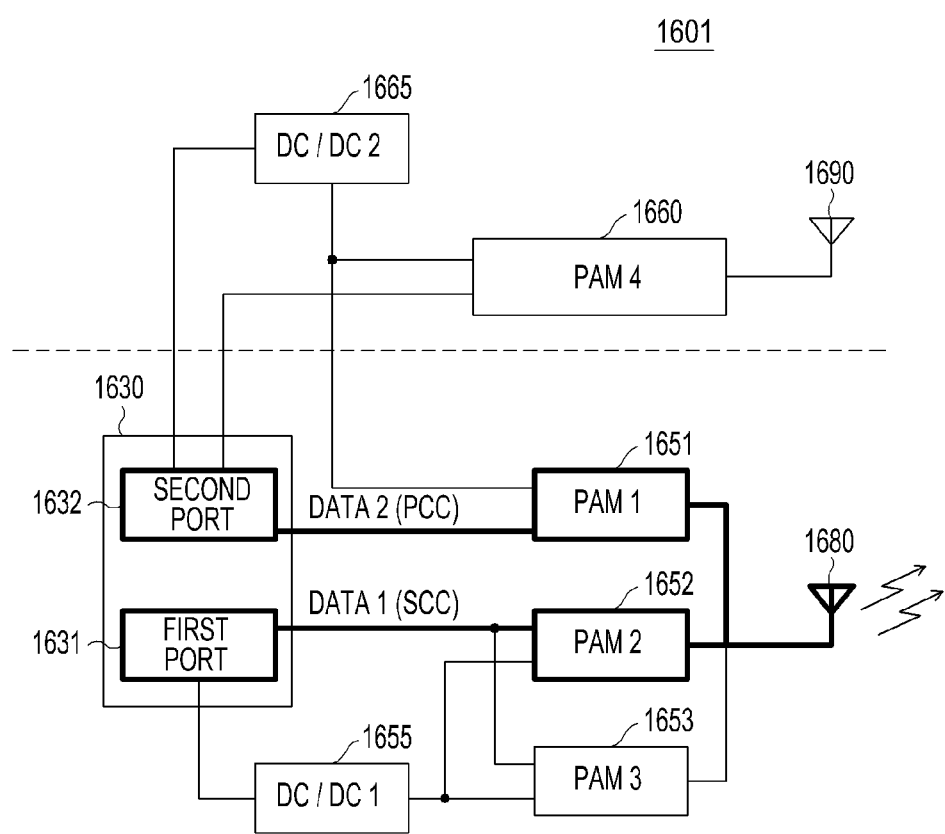
FIGS. 17A to 17D are block diagrams illustrating the uplink carrier aggregation operation of an electronic device according to various exemplary embodiments of the present disclosure.

Referring to FIG. 17A, the processor 220 may output the first data (DATA1) from a first port 1631 and may output the second data (DATA2) from a second port 1632.

The network 298 may request the PCC as a low-frequency band and may request the SCC as a medium-frequency band.

The processor 220 may output the second data (DATA2) corresponding to the PCC to a first amplifier 1651 and may output the first data (DATA1) corresponding to the SCC to a second amplifier 1652 according to a request from the network 298. The first amplifier 1651 may amplify the second data (DATA2) corresponding to the PCC into a signal in the low-frequency band, and the second amplifier 1652 may amplify the first data (DATA1) corresponding to the SCC into a signal in the medium-frequency band.

The processor 220 may transmit the second data (DATA2) corresponding to the PCC and the first data (DATA1) corresponding to the SCC to the network 298 via a first antenna 1680.

Figure 17B:
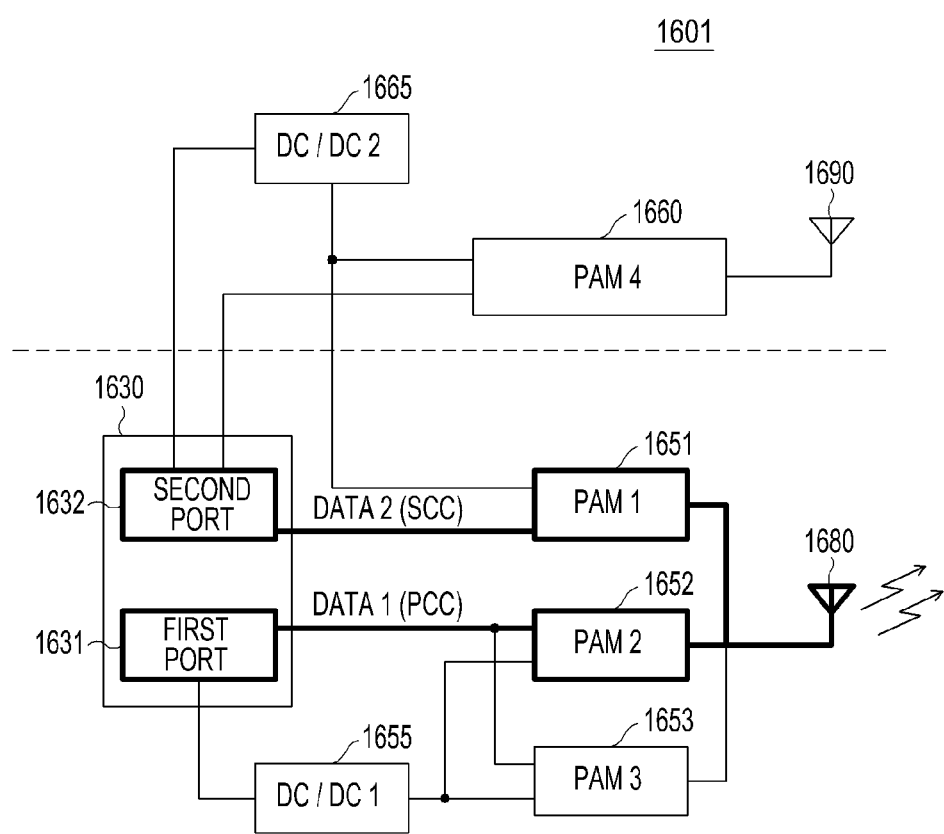

Referring to FIG. 17B, the processor 220 may output the first data (DATA1) from the first port 1631 and may output the second data (DATA2) from the second port 1632.

The network 298 may request the PCC as a medium-frequency band and may request the SCC as a low-frequency band.

The processor 220 may output the first data (DATA1) corresponding to the PCC to the second amplifier 1652 and may output the second data (DATA2) corresponding to the SCC to the first amplifier 1651 according to a request from the network 298. The second amplifier 1652 may amplify the first data (DATA1) corresponding to the PCC into a signal in the medium-frequency band, and the first amplifier 1651 may amplify the second data (DATA2) corresponding to the SCC into a signal in the low-frequency band.

The processor 220 may transmit the first data (DATA1) corresponding to the PCC and the second data (DATA2) corresponding to the SCC to the network 298 via the first antenna 1680.

Figure 17C:
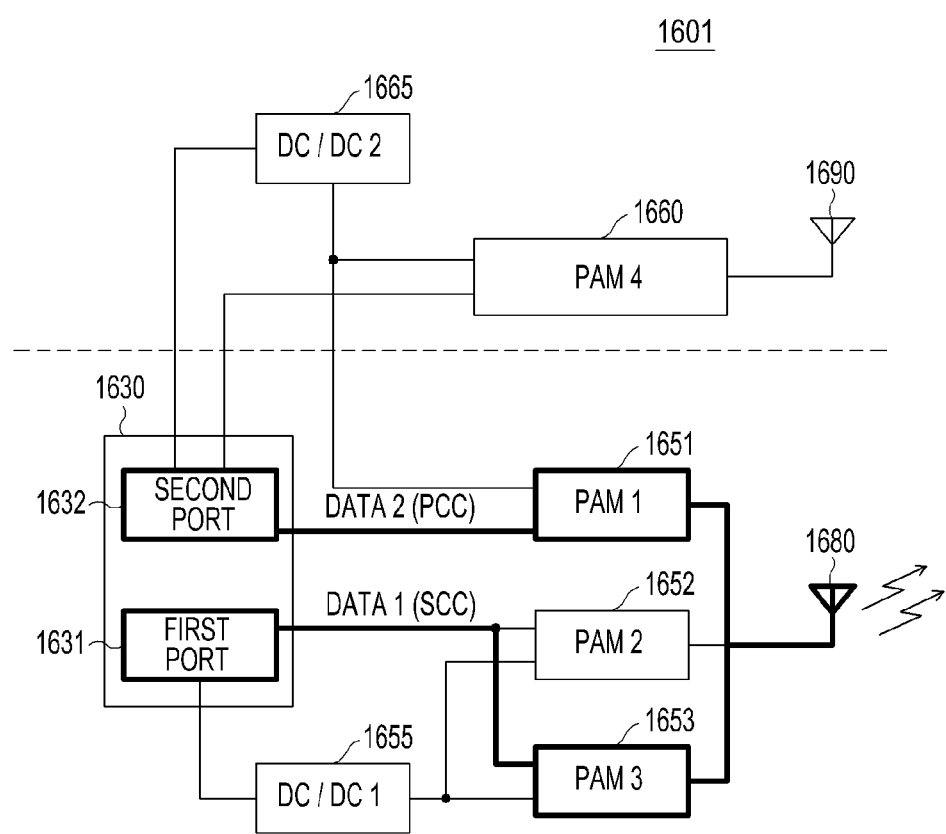

Referring to FIG. 17C, the processor 220 may output the first data (DATA1) from the first port 1631 and may output the second data (DATA2) from the second port 1632.

The network 298 may request the PCC as a low-frequency band and may request the SCC as a high-frequency band.

The processor 220 may output the second data (DATA2) corresponding to the PCC to the first amplifier 1651 and may output the first data (DATA1) corresponding to the SCC to a third amplifier 1653 according to a request from the network 298. The first amplifier 1651 may amplify the second data (DATA2) corresponding to the PCC into a signal in the low-frequency band, and the third amplifier 1653 may amplify the first data (DATA1) corresponding to the SCC into a signal in the high-frequency band.

The processor 220 may transmit the second data (DATA2) corresponding to the PCC and the first data (DATA1) corresponding to the SCC to the network 298 via a first antenna 1680.

According to another exemplary embodiment, the network 298 may request the PCC as a high-frequency band and may request the SCC as a low-frequency band.

The processor 220 may output the first data (DATA1) corresponding to the PCC to the third amplifier 1653 and may output the second data (DATA2) corresponding to the SCC to the first amplifier 1651 according to a request from the network 298. The third amplifier 1653 may amplify the first data (DATA1) corresponding to the PCC into a signal in the high-frequency band, and the first amplifier 1651 may amplify the second data (DATA2) corresponding to the SCC into a signal in the low-frequency band.

The processor 220 may transmit the first data (DATA1) corresponding to the PCC and the second data (DATA2) corresponding to the SCC to the network 298 via the first antenna 1680.

Figure 17D:
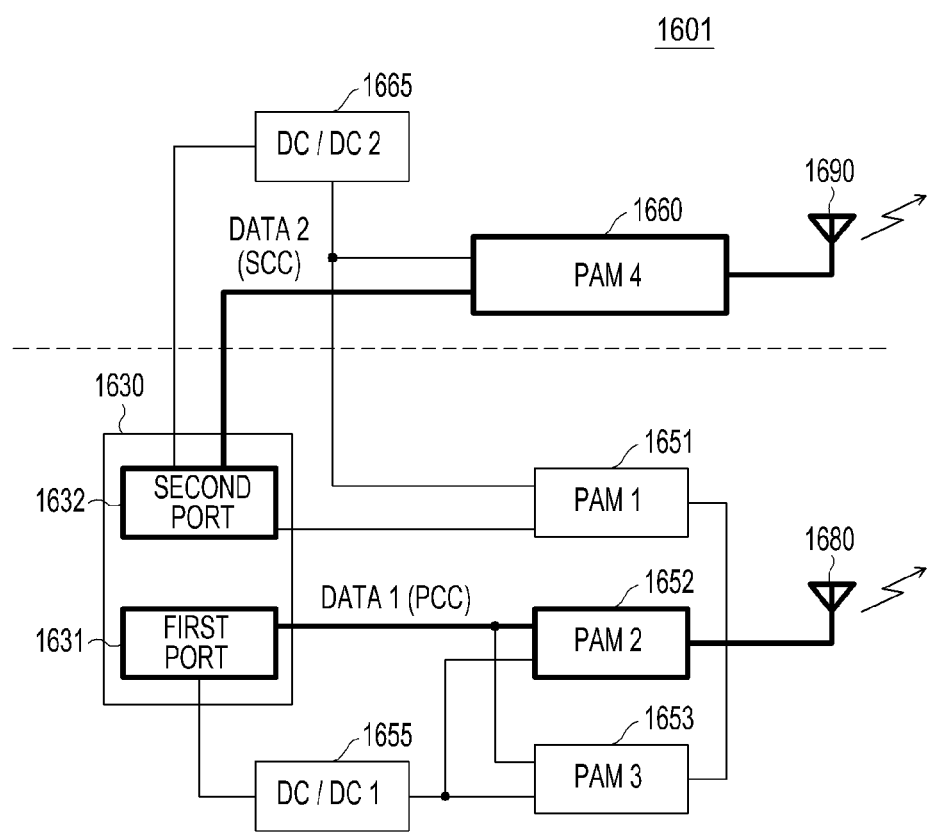

Referring to FIG. 17D, the processor 220 may output the first data (DATA1) from the first port 1631 and may output the second data (DATA2) from the second port 1632.

According to an exemplary embodiment, the network 298 may request the PCC as a medium-frequency band and may request the SCC as a high-frequency band.

The processor 220 may output the first data (DATA1) corresponding to the PCC to the second amplifier 1652 and may output the second data (DATA2) corresponding to the SCC to the fourth amplifier 1660 according to a request from the network 298. The second amplifier 1652 may amplify the first data (DATA1) corresponding to the PCC into a signal in the medium-frequency band, and the fourth amplifier 1660 may amplify the second data (DATA2) corresponding to the SCC into a signal in the high-frequency band.

The processor 220 may transmit the first data (DATA1) corresponding to the PCC to the network 298 via the first antenna 1680 and may transmit the second data (DATA2) corresponding to the SCC to the network 298 via the second antenna 1690.

According to another exemplary embodiment, the network 298 may request the PCC as a high-frequency band and may request the SCC as a high-frequency band. For example, the high-frequency band corresponding to the PCC and the high-frequency band corresponding to the SCC may be different.

The processor 220 may output the first data (DATA1) corresponding to the PCC to the third amplifier 1653 and may output the second data (DATA2) corresponding to the SCC to the fourth amplifier 1660 according to a request from the network 298. The third amplifier 1653 may amplify the first data (DATA1) corresponding to the PCC into a signal in the high-frequency band, and the fourth amplifier 1660 may amplify the second data (DATA2) corresponding to the SCC into a signal in the high-frequency band.

The processor 220 may transmit the first data (DATA1) corresponding to the PCC to the network 298 via the first antenna 1680 and may transmit the second data (DATA2) corresponding to the SCC to the network 298 via the second antenna 1690.

An electronic device according to various exemplary embodiments may include: a housing; a first antenna module configured to be disposed in a first end portion in the housing and to include a first antenna and a first amplifier unit in order to output a signal corresponding to the first antenna; a second antenna module configured to be disposed in a second end portion in the housing and to include a second antenna and a second amplifier unit in order to output a signal corresponding to the second antenna; and a transceiver configured to include a first port connected to the first antenna through the first amplifier unit and a second port connected to the second antenna through the second amplifier unit.

The electronic device may further include a processor configured to be electrically connected to the transceiver, wherein the processor may configured to output a first signal corresponding to first data to the first port or the second port of the transceiver on the basis of the frequency band of the first signal.

The first amplifier unit may include a first amplifier configured to output a signal corresponding to a first frequency band, a second amplifier configured to output a signal corresponding to a second frequency band, and a third amplifier configured to output a signal corresponding to a third frequency band, and the second amplifier unit may include a fourth amplifier configured to output a signal corresponding to the second frequency band and a fifth amplifier configured to output a signal corresponding to the third frequency band.

The processor may be configured to: output the first signal corresponding to the first data to the first antenna via the first port through any one of the first amplifier, the second amplifier, and the third amplifier; output the first signal through the second port on the basis of the frequency band of the first signal when antenna switching is required; and output the first signal, output from the second port, to the second antenna through any one of the fourth amplifier and the fifth amplifier on the basis of the frequency band of the first signal.

The processor may be configured to: output the first signal to the first amplifier through the first port when the frequency band of the first signal is a low-frequency band; and output the first signal, output from the first amplifier, to the second antenna by using a switch connected to the first amplifier.

The processor may be configured to output the first signal to the fourth amplifier or the fifth amplifier through the second port when the frequency band of the first signal is not a low-frequency band, and output the first signal, output from the fourth amplifier or the fifth amplifier, to the second antenna.

The first antenna module may further include a first power supplier configured to supply power to at least one amplifier included in the first antenna module; and the second antenna module may further include a second power supplier configured to supply power to at least one amplifier included in the second antenna module.

The processor may be configured to output the first signal through the second antenna when performance deterioration of the first antenna is sensed.

The processor may be configured to output the first signal, output to the first antenna through the first port, to the second antenna through the second port when there is no data to be transmitted through the first antenna for a specified time.

The processor may be configured to output the first signal to the second antenna through the second port while outputting the first signal to the first antenna.

The electronic device of may further include a processor configured to be electrically connected to the transceiver, wherein the processor may be configured to: output a first signal corresponding to the first data to the first port and output a second signal corresponding to the second data to the second port.

The first amplifier unit may include a first amplifier configured to output a signal corresponding to a first frequency band, a second amplifier configured to output a signal corresponding to a second frequency band, and a third amplifier configured to output a signal corresponding to a third frequency band, and the second amplifier unit may include a fourth amplifier configured to output a signal corresponding to the second frequency band and a fifth amplifier configured to output a signal corresponding to the third frequency band.

The processor may be configured to: output the first signal corresponding to the first data, output from the first port, through any one of the second amplifier and the third amplifier; and output the second signal corresponding to the second data, output from the second port, through any one of the first amplifier, the fourth amplifier, and the fifth amplifier.

The first signal may be a signal corresponding to a Primary Component Carrier (PCC) and the second signal may be a signal corresponding to a Secondary Component Carrier (SCC).

The first signal may be a signal corresponding to an SCC, and the second signal may be a signal corresponding to a PCC.

A method for operating an electronic device includes outputting a first signal corresponding to first data to a first antenna disposed in a first end portion of the electronic device via a first port of a transceiver included in the electronic device through any one of a first amplifier, a second amplifier, and a third amplifier disposed in the first end portion of the electronic device, outputting the first signal through a second port of the transceiver on the basis of the frequency band of the first signal when antenna switching is required, and outputting the first signal, output from the second port, to a second antenna disposed in a second end portion of the electronic device through any one of a fourth amplifier and a fifth amplifier disposed in the second end portion on the basis of the frequency band of the first signal.

The method may further include outputting the first signal to the first amplifier corresponding to a low-frequency band through the first port when the frequency band of the first signal is the low-frequency band, and outputting the first signal, output from the first amplifier, to the second antenna by using a switch connected to the first amplifier.

The outputting of the first signal to the second antenna may include outputting the first signal to the fourth amplifier corresponding to a medium-frequency band through the second port when the frequency band of the first signal is the medium-frequency band, and outputting the first signal to the second antenna through the fourth amplifier.

The outputting of the first signal to the second antenna may include outputting the first signal to the fifth amplifier corresponding to a high-frequency band through the second port when the frequency band of the first signal is the high-frequency band, and outputting the first signal to the second antenna through the fifth amplifier.

The method may further include monitoring performance of the first antenna and determining whether to perform antenna switching on the basis of a deterioration in the performance of the first antenna.

An electronic device according to various exemplary embodiments may include a processor, a first antenna, a second antenna, a first amplifier unit configured to be electrically connected to the first antenna and to amplify a signal in a first specified frequency band, a second amplifier unit configured to be electrically connected to the second antenna and to amplify a signal in a second specified frequency band, and a transceiver configured to include at least one of a first port electrically connected to the first amplifier and a second port electrically connected to the second amplifier.

Each of the components of the electronic device, according to the present disclosure, may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments may be combined to form a single entity, and thus, may equivalently execute functions of the corresponding elements prior to the combination.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fail within the scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a housing;
   a first antenna circuitry that is disposed in a first end portion in the housing, and comprises a first antenna and a first amplifier circuitry to output a signal corresponding to the first antenna;
   a second antenna circuitry that is disposed in a second end portion in the housing, and comprises a second antenna and a second amplifier circuitry to output a signal corresponding to the second antenna;
   a transceiver including a first port connected to the first antenna through the first amplifier circuitry, and a second port connected to the second antenna through the second amplifier circuitry, wherein a first plurality of amplifiers in the first amplifier circuitry is coupled to the first port and a second plurality of amplifiers in the second amplifier circuitry is coupled to the second port; and
   a processor configured to output a first signal corresponding to first data to the first port or the second port of the transceiver based on a frequency band of the first signal,
   wherein, when antenna switching is required while outputting the first signal through the first antenna and the frequency band of the first signal is a low-frequency band which is lower than a preset frequency value, the processor is configured to control to output the first signal through the second antenna, via the first port and the first amplifier circuitry, and
   wherein, when the antenna switching is required while outputting the first signal through the first antenna and the frequency band of the first signal is equal to or higher than the preset frequency value, the processor is configured to control to output the first signal through the second antenna, via the second port and the second amplifier circuitry.

2. The electronic device of claim 1, wherein:
   the first amplifier circuitry comprises:
     a first amplifier configured to output a signal corresponding to a first frequency band;
     a second amplifier configured to output a signal corresponding to a second frequency band; and
     a third amplifier configured to output a signal corresponding to a third frequency band; and
   the second amplifier circuitry comprises:
     a fourth amplifier configured to output a signal corresponding to the second frequency band; and
     a fifth amplifier configured to output a signal corresponding to the third frequency band.

3. The electronic device of claim 2, wherein the processor is configured to:
   output the first signal corresponding to the first data to the first antenna via the first port through one of: the first amplifier, the second amplifier, or the third amplifier;
   output the first signal through the second port based on the frequency band of the first signal when the antenna switching is required; and
   output the first signal, after being output from the second port, to the second antenna through one of the fourth amplifier or the fifth amplifier based on the frequency band of the first signal.

4. The electronic device of claim 3, wherein the processor is configured to:
   output the first signal to the first amplifier through the first port when the frequency band of the first signal is a low-frequency band; and
   output the first signal, after being output from the first amplifier, to the second antenna using a switch connected to the first amplifier.

5. The electronic device of claim 3, wherein the processor is configured to:
   output the first signal to the fourth amplifier or the fifth amplifier through the second port when the frequency band of the first signal is not a low-frequency band; and
   output the first signal, after being output from the fourth amplifier or the fifth amplifier, to the second antenna.

6. The electronic device of claim 3, wherein the processor is configured to output the first signal through the second antenna when performance deterioration of the first antenna is sensed.

7. The electronic device of claim 3, wherein the processor is configured to output the first signal, output to the first antenna through the first port, to the second antenna through the second port when there is no data to be transmitted through the first antenna for a specified time.

8. The electronic device of claim 3, wherein the processor is configured to output the first signal to the second antenna through the second port while outputting the first signal to the first antenna until the first signal through the first antenna is not output.

9. The electronic device of claim 1, wherein the first antenna circuitry further comprises a first power supplier configured to supply power to at least one amplifier comprised in the first antenna circuitry; and
   the second antenna circuitry further comprises a second power supplier configured to supply power to at least one amplifier comprised in the second antenna circuitry.

10. The electronic device of claim 1, wherein the processor is configured to:
    output the first signal corresponding to the first data to the first port; and
    output a second signal corresponding to second data to the second port.

11. The electronic device of claim 10, wherein the first amplifier circuitry comprises:
    a first amplifier configured to output a signal corresponding to a first frequency band, a second amplifier configured to output a signal corresponding to a second frequency band, and a third amplifier configured to output a signal corresponding to a third frequency band, and
    the second amplifier circuitry comprises a fourth amplifier configured to output a signal corresponding to the second frequency band and a fifth amplifier configured to output a signal corresponding to the third frequency band.

12. The electronic device of claim 11, wherein the processor is configured to:
    output the first signal corresponding to the first data, output from the first port, through one of the second amplifier or the third amplifier; and
    output the second signal corresponding to the second data, output from the second port, through one of: the first amplifier, the fourth amplifier, or the fifth amplifier.

13. The electronic device of claim 12, wherein the first signal is a signal corresponding to a Primary Component Carrier (PCC), and the second signal is a signal corresponding to a Secondary Component Carrier (SCC).

14. The electronic device of claim 12, wherein the first signal is a signal corresponding to a SCC, and the second signal is a signal corresponding to a PCC.

15. The electronic device of claim 1, wherein the processor is configured to:
- monitor performance of the first antenna while outputting the first signal through the first antenna; and
- output the first signal through the second antenna when performance deterioration of the first antenna is detected.

16. A method for operating an electronic device, the method comprising:
- outputting a first signal corresponding to first data to a first antenna disposed in a first end portion of the electronic device via a first port of a transceiver comprised in the electronic device through one of: a first amplifier, a second amplifier, or a third amplifier disposed in the first end portion of the electronic device;
- outputting the first signal through a second port of the transceiver based on a frequency band of the first signal when antenna switching is required; and
- outputting the first signal, after being output from the second port, to a second antenna disposed in a second end portion of the electronic device through one of a fourth amplifier or a fifth amplifier disposed in the second end portion based on the frequency band of the first signal.

17. The method of claim 16, further comprising:
- outputting the first signal to the first amplifier corresponding to a low-frequency band through the first port when the frequency band of the first signal is the low-frequency band; and
- outputting the first signal, after being output from the first amplifier, to the second antenna using a switch connected to the first amplifier.

18. The method of claim 16, wherein the outputting of the first signal to the second antenna comprises:
- outputting the first signal to the fourth amplifier corresponding to a medium-frequency band through the second port when the frequency band of the first signal is the medium-frequency band; and
- outputting the first signal to the second antenna through the fourth amplifier.

19. The method of claim 16, wherein the outputting of the first signal to the second antenna comprises:
- outputting the first signal to the fifth amplifier corresponding to a high-frequency band through the second port when the frequency band of the first signal is the high-frequency band; and
- outputting the first signal to the second antenna through the fifth amplifier.

20. The method of claim 16, further comprising:
monitoring a performance of the first antenna; and
determining whether to perform the antenna switching based on a deterioration in the performance of the first antenna.

* * * * *